US012689420B2

(12) United States Patent
Patil et al.

(10) Patent No.: US 12,689,420 B2
(45) Date of Patent: Jul. 21, 2026

(54) BEAMFORMING TECHNIQUES IN WI-FI FREQUENCY BANDS

(71) Applicant: QUALCOMM Incorporated, San Diego, CA (US)

(72) Inventors: Abhishek Pramod Patil, San Diego, CA (US); Yanjun Sun, San Diego, CA (US); Lin Yang, San Diego, CA (US); Gaurang Naik, San Diego, CA (US); Sai Yiu Duncan Ho, San Diego, CA (US); George Cherian, San Diego, CA (US); Alfred Asterjadhi, San Diego, CA (US); Abdel Karim Ajami, Lakeside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 17/855,427

(22) Filed: Jun. 30, 2022

(65) Prior Publication Data

US 2024/0007154 A1    Jan. 4, 2024

(51) Int. Cl.
H04B 7/06 (2006.01)
H04B 7/08 (2006.01)
(52) U.S. Cl.
CPC ......... H04B 7/0617 (2013.01); H04B 7/0695 (2013.01); H04B 7/088 (2013.01)
(58) Field of Classification Search
CPC .................................................. H04B 7/0617
See application file for complete search history.

(56) References Cited

U.S. PATENT DOCUMENTS

| | | | |
|---|---|---|---|
| 10,291,305 B2 | 5/2019 | Jo et al. | |
| 10,484,980 B1 * | 11/2019 | Jiang .................... | H04B 7/0695 |
| 11,356,996 B2 | 6/2022 | Zhou et al. | |
| 2016/0014722 A1 * | 1/2016 | Yoon .................... | H04B 7/0617 |
| | | | 455/552.1 |
| 2016/0277087 A1 * | 9/2016 | Jo ......................... | H04B 7/0617 |
| 2018/0131434 A1 * | 5/2018 | Islam .................. | H04W 72/046 |

(Continued)

OTHER PUBLICATIONS

International Search Report and Written Opinion—PCT/US2023/020374—ISA/EPO—Oct. 6, 2023.

(Continued)

*Primary Examiner* — Abdeltif Ajid
(74) *Attorney, Agent, or Firm* — Holland & Hart LLP

(57) ABSTRACT

Methods, systems, and devices for wireless communications are described. A first wireless device may communicate signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The first wireless device may then communicate one or more messages with the second wireless device via the radio frequency link using a beam, where the beam is based on whether the signaling indicates the first wireless device and the second wireless device are to skip performance of the beam training procedure, or indicates the selection between the first beam training procedure and the second beam training procedure.

28 Claims, 12 Drawing Sheets

(56) References Cited

U.S. PATENT DOCUMENTS

| | | | | |
|---|---|---|---|---|
| 2019/0312619 A1* | 10/2019 | Abedini | ............... | H04B 7/0696 |
| 2022/0352953 A1* | 11/2022 | Huang | ................. | H04W 76/28 |
| 2025/0038821 A1* | 1/2025 | Maleki | ................. | H04B 7/0695 |

OTHER PUBLICATIONS

Partial International Search Report—PCT/US2023/020374—ISA/EPO—Aug. 14, 2023.

* cited by examiner

205 —↘

Signaling
215
(Beam Training For
Second RF Link?)

First RF Link
210-a
(Sub-7)

Second RF Link
210-b
(Non-Sub-7)

200

510

520

515

505

500

Figure 9:
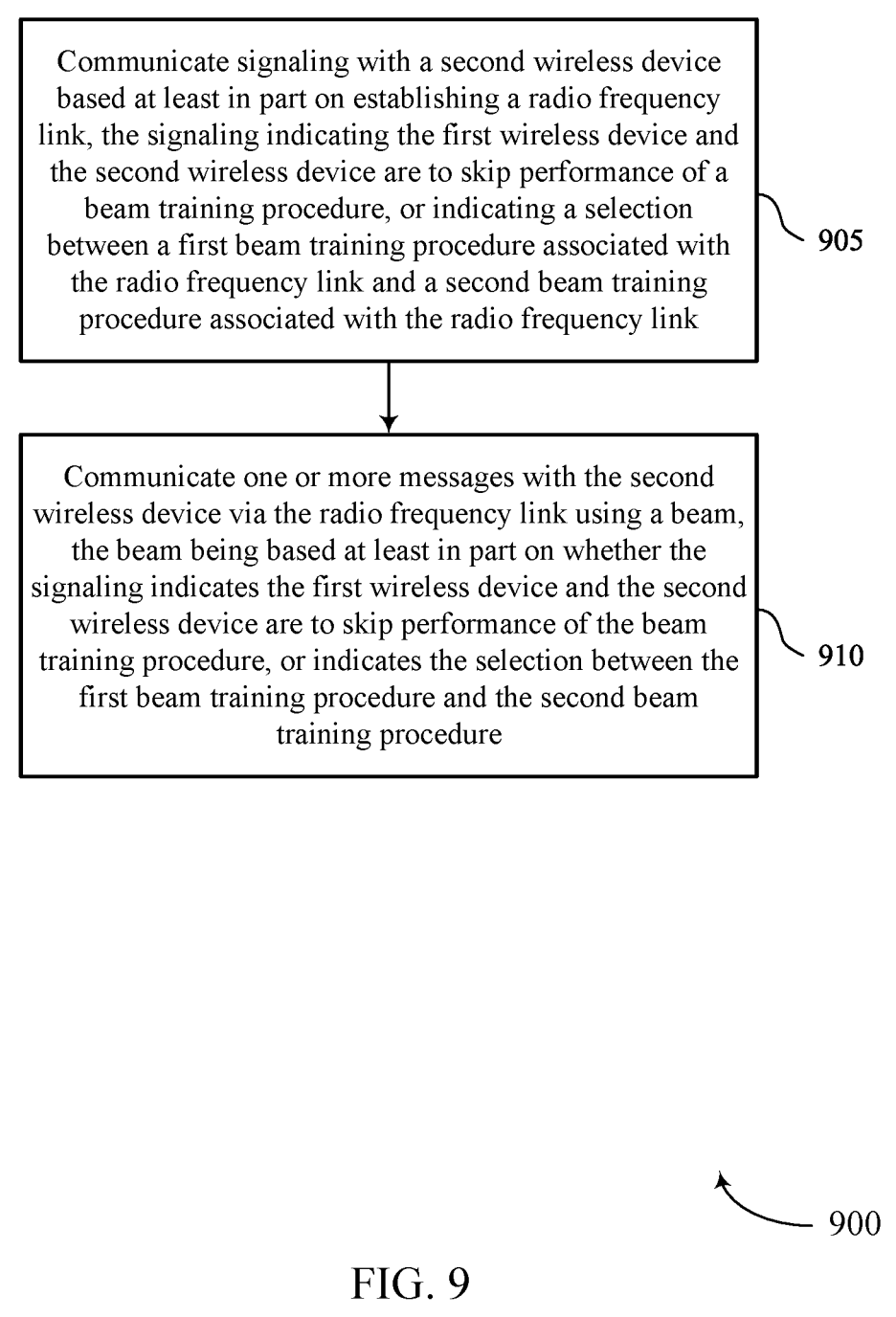

Communicate signaling with a second wireless device based at least in part on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link

905

Communicate one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure

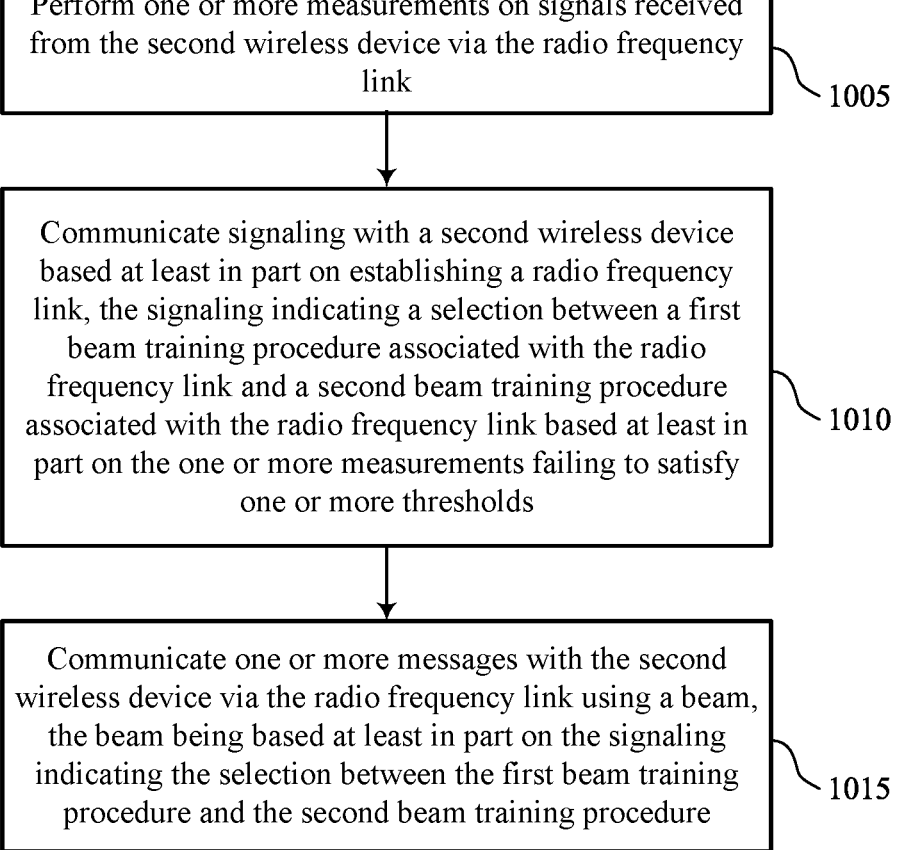

Perform one or more measurements on signals received from the second wireless device via the radio frequency link

1005

Communicate signaling with a second wireless device based at least in part on establishing a radio frequency link, the signaling indicating a selection between a first beam training procedure associated with the radio frequency link and a second beam training procedure associated with the radio frequency link based at least in part on the one or more measurements failing to satisfy one or more thresholds

1010

Communicate one or more messages with the second wireless device via the radio frequency link using a beam, the beam being based at least in part on the signaling indicating the selection between the first beam training procedure and the second beam training procedure

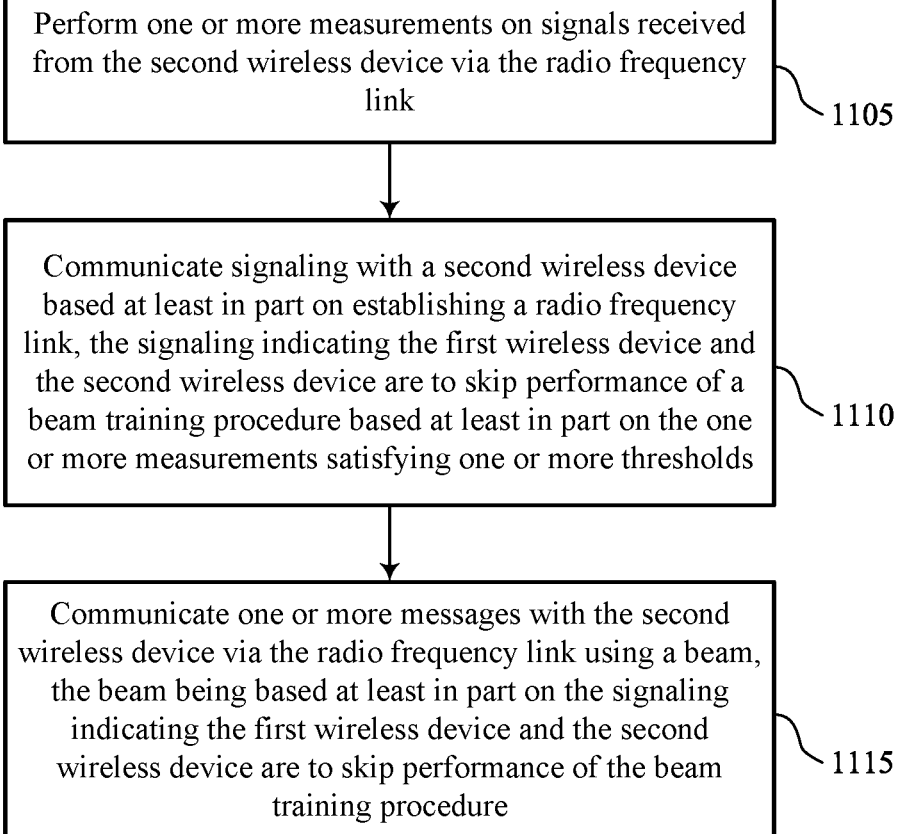

Perform one or more measurements on signals received from the second wireless device via the radio frequency link

1105

Communicate signaling with a second wireless device based at least in part on establishing a radio frequency link, the signaling indicating the first wireless device and the second wireless device are to skip performance of a beam training procedure based at least in part on the one or more measurements satisfying one or more thresholds

1110

Communicate one or more messages with the second wireless device via the radio frequency link using a beam, the beam being based at least in part on the signaling indicating the first wireless device and the second wireless device are to skip performance of the beam training procedure

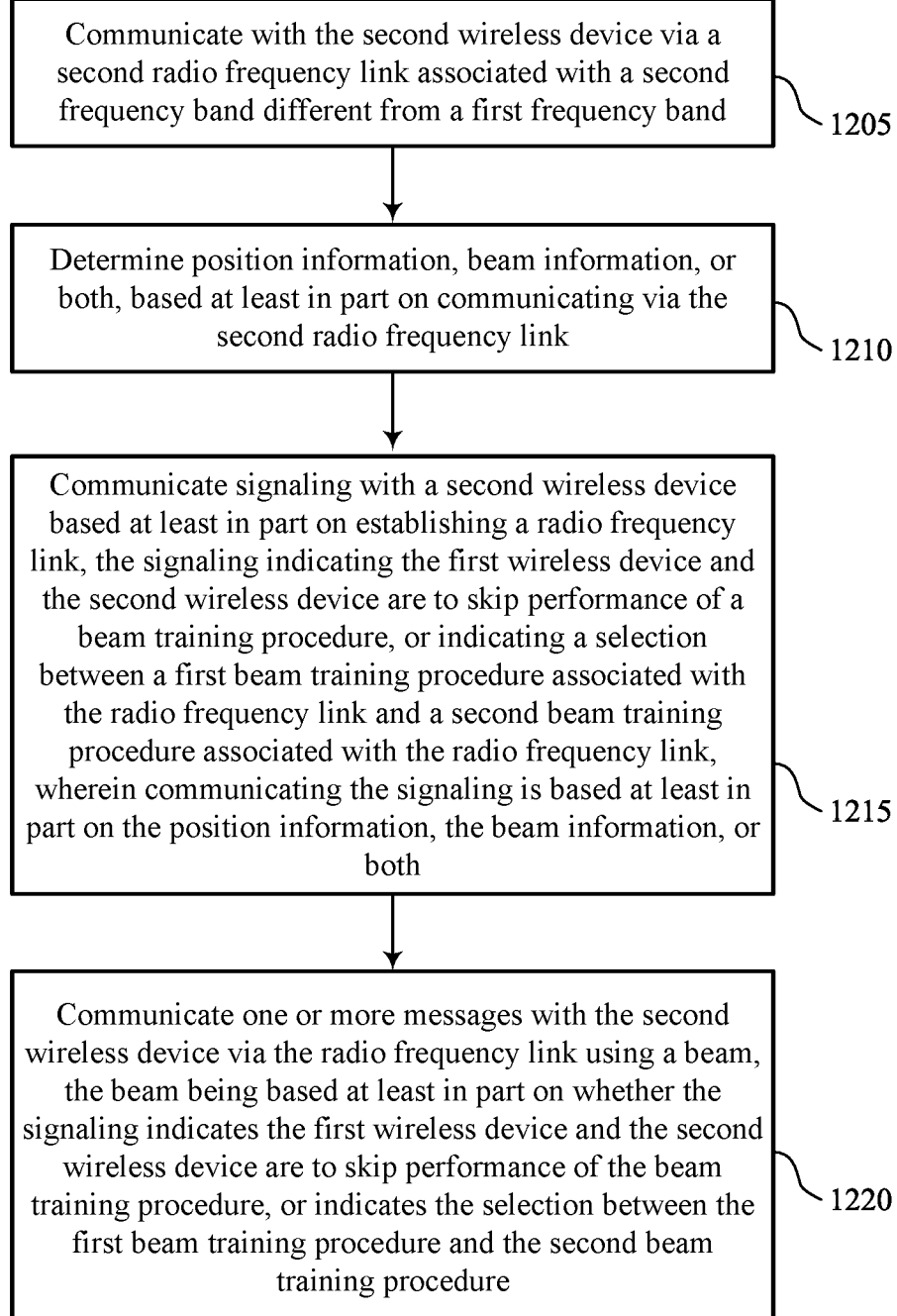

Communicate with the second wireless device via a second radio frequency link associated with a second frequency band different from a first frequency band

1205

Determine position information, beam information, or both, based at least in part on communicating via the second radio frequency link

1210

Communicate signaling with a second wireless device based at least in part on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link, wherein communicating the signaling is based at least in part on the position information, the beam information, or both

1215

Communicate one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure

BEAMFORMING TECHNIQUES IN WI-FI FREQUENCY BANDS

TECHNICAL FIELD

The following relates to wireless communications, including beamforming techniques in Wi-Fi frequency bands.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

Many Wi-Fi deployments may use 2.4 GHz, 5 GHz, and/or 6 GHz bands, which may be referred to as "sub-7" GHz bands. Future Wi-Fi enhancements aim to leverage multi-link operation techniques to enhance a user experience within other frequency bands, such as a 60 GHz frequency band. While the 60 GHz band may offer a large swath of resources for Wi-Fi devices to use, the 60 GHz band is not widely used due to several challenges, including high propagation loss. As such, there is a need to improve Wi-Fi communications on respective frequency bands, such as the 60 GHz band.

SUMMARY

The described techniques relate to improved methods, systems, devices, or apparatuses that support beamforming techniques in Wi-Fi frequency bands. Generally, aspects of the present disclosure are directed to techniques that enable wireless devices to exchange information indicating whether beam training procedures are expected to be performed for a Wi-Fi frequency band (e.g., 60 GHz link), and, if a beam training procedure is expected to be performed, what level of beam training procedures should be performed. In particular, wireless devices may be able to completely refrain from performing beam training in some circumstances, or may be able to perform less precise (and less power intensive) beam training procedures. For example, a relative quality of communications performed over a 60 GHz link may be used to determine whether a beam training procedure should be performed, or how precise (and therefore power intensive) of a beam training procedure should be performed. In other cases, information determined from other links, such as sub-7 GHz links, may be used to facilitate beam training procedures on the 60 GHz link. For example, position information and/or beam information determined using the sub-7 link may be used to determine whether (or what level of precision) of beam training procedures should be performed on the 60 GHz link.

A method for wireless communications at a first wireless device is described. The method may include communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link and communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

An apparatus for wireless communications at a first wireless device is described. The apparatus may include a processor, memory coupled with the processor, and instructions stored in the memory. The instructions may be executable by the processor to cause the apparatus to communicate signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link and communicate one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

Another apparatus for wireless communications at a first wireless device is described. The apparatus may include means for communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link and means for communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

A non-transitory computer-readable medium storing code for wireless communications at a first wireless device is described. The code may include instructions executable by a processor to communicate signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link and communicate one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

Some examples of the method, apparatuses, and non-transitory computer-readable medium described herein may further include operations, features, means, or instructions for performing one or more measurements on signals received from the second wireless device via the radio frequency link, where the signaling indicates the selection between the first beam training procedure and the second beam training procedure based on the one or more measurements failing to satisfy one or more thresholds.

Some examples of the method, apparatuses, and non-transitory computer-readable medium described herein may further include operations, features, means, or instructions for performing one or more measurements on signals received from the second wireless device via the radio frequency link, where the signaling indicates the first wireless device and the second wireless device may be to skip performance of the beam training procedure based on the one or more measurements satisfying one or more thresholds.

In some examples of the method, apparatuses, and non-transitory computer-readable medium described herein, the radio frequency link may be associated with a first frequency band and the method, apparatuses, and non-transitory computer-readable medium may include further operations, features, means, or instructions for communicating with the second wireless device via a second radio frequency link associated with a second frequency band different from the first frequency band, where communicating the signaling may be based on position information, beam information, or both, where the position information, the beam information, or both, may be based on communicating via the second radio frequency link.

In some examples of the method, apparatuses, and non-transitory computer-readable medium described herein, the first frequency band may be associated with a frequency above 7 GHz and the second frequency band may be associated with a frequency below 7 GHz.

Some examples of the method, apparatuses, and non-transitory computer-readable medium described herein may further include operations, features, means, or instructions for communicating the signaling indicating the selection between the first beam training procedure and the second beam training procedure based on the first wireless device, the second wireless device, or both, previously operating in accordance with an idle state for at least a time duration.

In some examples of the method, apparatuses, and non-transitory computer-readable medium described herein, the first beam training procedure includes a beam refinement procedure without a sector-level training procedure, and the method, apparatuses, and non-transitory computer-readable medium may include further operations, features, means, or instructions for performing one of the first beam training procedure or the second beam training procedure in accordance with the signaling indicating the selection between the first beam training procedure and the second beam training procedure, where the beam used for communicating the one or more messages via the radio frequency link may be selected based on performing the first beam training procedure or the second beam training procedure.

In some examples of the method, apparatuses, and non-transitory computer-readable medium described herein, performing the second beam training procedure may include operations, features, means, or instructions for receiving, from the second wireless device during one or more beacon transmit intervals associated with the sector-level training procedure, a first set of multiple signals using a set of multiple wide beams that may be spatially separated within a set of multiple sectors to identify a first sector of the set of multiple sectors and receiving, from the second wireless device during one or more service periods associated with the beam refinement procedure, a second set of multiple signals using a set of multiple narrow beams that may be spatially separated within the first sector, where the beam may be selected from the set of multiple narrow beams.

In some examples of the method, apparatuses, and non-transitory computer-readable medium described herein, performing the second beam training procedure may include operations, features, means, or instructions for transmitting, to the second wireless device during one or more service periods associated with the sector-level training procedure, a first set of multiple signals using a set of multiple wide beams that may be spatially separated within a sector of a set of multiple sectors to identify a first sector of the set of multiple sectors and transmitting, to the second wireless device during one or more additional service periods associated with the beam refinement procedure, a second set of multiple signals using a set of multiple narrow beams that may be spatially separated within the first sector, where the beam may be selected from the set of multiple narrow beams.

In some examples of the method, apparatuses, and non-transitory computer-readable medium described herein, performing the first beam training procedure may include operations, features, means, or instructions for transmitting, to the second wireless device as part of the beam refinement procedure, a set of multiple signals using a subset of narrow beams of the set of multiple narrow beams that may be spatially separated across a sector of the set of multiple sectors, where the beam may be selected from the subset of narrow beams.

In some examples of the method, apparatuses, and non-transitory computer-readable medium described herein, performing the second beam training procedure may include operations, features, means, or instructions for receiving, from the second wireless device as part of the sector-level training procedure, a first set of multiple signals using a set of multiple wide beams that may be spatially separated across a set of multiple sectors to identify a first sector of the set of multiple sectors and receiving, from the second wireless device as part of the beam refinement procedure, a second set of multiple signals using a set of multiple narrow beams that may be spatially separated across the first sector, where the beam may be selected from the set of multiple narrow beams.

Some examples of the method, apparatuses, and non-transitory computer-readable medium described herein may further include operations, features, means, or instructions for communicating, with the second wireless device, a message indicating the first sector of the set of multiple sectors based on transmitting the first set of multiple signals as part of the sector-level training procedure, where transmitting the second set of multiple signals as part of the beam refinement procedure may be based on the message indicating the first sector.

Some examples of the method, apparatuses, and non-transitory computer-readable medium described herein may further include operations, features, means, or instructions for communicating, with the second wireless device, a request for one of the first beam training procedure or the second beam training procedure, where the signaling indicates the selection between the first beam training procedure and the second beam training procedure based on the request.

Some examples of the method, apparatuses, and non-transitory computer-readable medium described herein may further include operations, features, means, or instructions for communicating the signaling based on a mobility state associated with the first wireless device, the second wireless device, or both.

In some examples of the method, apparatuses, and non-transitory computer-readable medium described herein, the first wireless device includes an AP, a first multi-link device, or both, the second wireless device includes a STA, a second multi-link device, or both, the first wireless device includes the STA, the first multi-link device, or both, and the second wireless device includes the AP, the second multi-link device, or both.

BRIEF DESCRIPTION OF THE DRAWINGS

FIGS. 9 through 12 show flowcharts illustrating methods that support beamforming techniques in Wi-Fi frequency bands in accordance with one or more aspects of the present disclosure.

DETAILED DESCRIPTION

Figure 1:
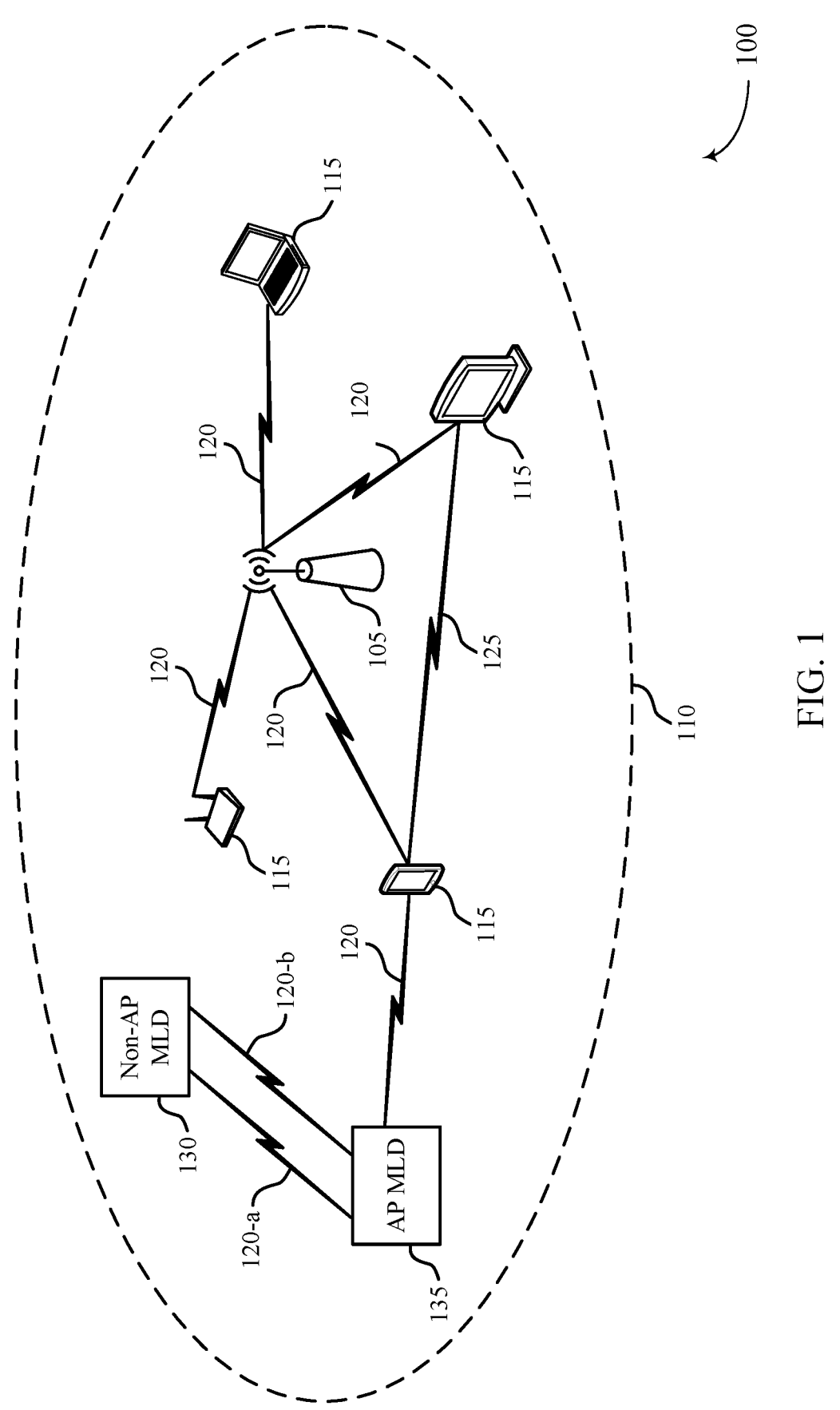
FIG. 1 illustrates an example of a wireless communications system that supports beamforming techniques in Wi-Fi frequency bands in accordance with aspects of the present disclosure.

In some deployments, wireless devices (such as wireless fidelity (Wi-Fi) devices) may support multi-link operation (MLO) according to which the devices may communicate via multiple different links. For example, an access point (AP) multi-link device (MLD) may communicate with a non-AP MLD via a 2.4 gigahertz (GHz) link, a 5 GHz link, a 6 GHz link, or any combination thereof, which may generally be referred to as "sub-7" GHz bands. In some systems, an AP MLD and a non-AP MLD may be capable of communication via other radio frequency links, such as 45 GHz and GHz links (e.g., non-sub-7 links), which may provide relatively higher data rates or greater link diversity.

Communication over such other radio frequency links may present several challenges, which may hinder adoption of such other radio frequency links (which may, in turn, limit an achievable throughput or diversity of a system). For example, the non-sub-7 bands, such as the GHz and the 60 GHz bands, may be relatively more susceptible to propagation losses as compared to sub-7 bands. As such, beam refinement procedures may be utilized in sub-7 bands and in the GHz band to identify beams within the respective bands that exhibit sufficient performance and are less susceptible to propagation loss. However, performance of multiple beam training procedures for different bands may be time consuming, and may increase power consumption at the wireless devices.

Accordingly, aspects of the present disclosure are directed to techniques that enable wireless devices (e.g., AP MLD, non-AP MLD) to exchange information indicating whether beam training procedures are expected to be performed for a radio frequency link (e.g., Wi-Fi link, 60 GHz link), and, if a beam training procedure is expected to be performed, what level or type of beam training procedures should be performed. In particular, wireless devices may be able to completely refrain from performing beam training in some circumstances, thereby avoiding time and power consumption used for beam training in situations where beam training may not be needed or useful. Comparatively, when beam training is expected to be performed for the radio frequency link (e.g., Wi-Fi link, 60 GHz link) the wireless devices may indicate whether the devices are expected to perform a more precise (and therefore more power intensive) beam training procedure, or whether the devices can perform a less precise perform less precise (and therefore more power intensive) beam training procedure for the radio frequency link. In this way, power recourses may be more efficiently used for different situations when beam training is expected to be performed.

Particular implementations of the subject matter described in this disclosure can be implemented to realize one or more of the following potential advantages. For example, by exchanging signaling indicating whether, or what type/extent, of beam training is expected for a respective radio frequency link, a wireless devices (e.g., AP MLD, non-AP MLD) may be able to completely refrain from performing beam training procedures for the respective radio frequency link, thereby decreasing resource usage, and reducing power consumption at the wireless devices. Moreover, in cases where beam training is still expected to be performed on the respective radio frequency link, by exchanging signaling indicating the type/extent of beam training that is expected, the wireless devices may be able to perform shorter and less power-intensive beam training procedures, thereby expediting communications performed on the radio frequency link, reducing power consumption at the wireless devices, and improving overall user experience. Further, enabling the wireless devices to perform less intensive beam training procedures may result in a more efficient use of wireless resources.

In some implementations, a relative quality of communications performed over a 60 GHz link may be used to determine whether a beam training procedure should be performed, or how precise (and therefore power intensive) of a beam training procedure should be performed. In other cases, information determined from other links, such as sub-7 GHz links, may be used to facilitate beam training procedures on the 60 GHz link. For example, position information and/or beam information determined using a sub-7 link may be used to determine whether (or what level of precision) of beam training procedures should be performed on the 60 GHz link.

Techniques described herein may utilize one or more parameters, such as mobility information and/or a quality of communications performed over non-sub-7 links, to determine whether (or what extent of) beam training is needed on the non-sub-7 links. As such, techniques described herein may enable wireless devices (e.g., AP MLD, non-AP MLD) to refrain from performing beam training for non-sub-7 links in some scenarios, thereby reducing power consumption and expediting communications over the non-sub-7 links. Moreover, by leveraging communications on sub-7 bands to facilitate beam training on non-sub-7 bands, techniques described herein may leverage existing Wi-Fi frameworks and signaling to improve beam training techniques for non-sub-7 bands.

Aspects of the disclosure are initially described in the context of a wireless communications system. Additional aspects of the disclosure are described in the context of an example L2 message formats and an example process flow. Aspects of the disclosure are further illustrated by and described with reference to apparatus diagrams, system diagrams, and flowcharts that relate to beamforming techniques in Wi-Fi frequency bands.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving RF signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

FIG. 1 illustrates a wireless communications system 100 configured in accordance with various aspects of the present disclosure. The wireless communications system 100 may be an example of a wireless local area network (WLAN) or a Wi-Fi network and may include an AP 105 and multiple associated STAs 115, which may represent devices such as mobile stations, personal digital assistant (PDAs), other handheld devices, netbooks, notebook computers, tablet computers, laptops, display devices (such as TVs or computer monitors), or printers. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a BSA of the wireless communications system 100. An extended network station (not shown) associated with the wireless communications system 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some implementations, the coverage area 110 of an AP 105 may be divided into sectors (also not shown). The wireless communications system 100 may include APs 105 of different types (such as metropolitan area, or home network), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, or 802.11be. In some other implementations, peer-to-peer (P2P) connections or ad hoc networks may be implemented within wireless communications system 100.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment, such as a carrier-sense multiple access with collision avoidance (CSMA/CA) environment, because the STAs 115 may transmit at the same time. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some implementations, the wireless communications system 100 may support MLO according to which two or more devices may communicate via two or more wireless links, such as two or more radio frequency links. MLO may refer or apply to pre-association or post-association operation. In such implementations, the wireless communications system 100 may include one or more MLDs that are capable of communicating (such as transmitting or receiving) via multiple links. In some aspects, one or more STAs 115 may be associated or affiliated with a first MLD, such as a non-AP MLD 130, and one or more APs 105 may be associated or affiliated with a second MLD, such as an AP MLD 135. The one or more STAs 115 or APs 105 affiliated with an MLD may be associated with multiple functionalities of the MLD.

For example, an MLD may be a device that is capable of communicating via multiple radio frequency links and operation or functionality of the MLD at each of the multiple radio frequency links may be described as being performed by a respective STA 115 (in examples in which the MLD is a non-AP MLD 130, such that each STA 115 affiliated with a non-AP MLD 130 is a non-AP STA 115) or a respective AP 105 (in examples in which the MLD is an AP MLD 135, such that each STA 115 affiliated with an AP MLD 135 is or functions as an AP 105). As such, a non-AP MLD 130 may communicate (such as transmit or receive) via a first radio frequency link using a first STA 115 and may communicate (such as transmit or receive) via a second radio frequency link using a second STA 115. Similarly, an AP MLD 135 may communicate (such as transmit or receive) via a first radio frequency link using a first AP 105 and may communicate (such as transmit or receive) via a second radio frequency link using a second AP 105. For example, a non-AP MLD 130 may effectively communicate with an AP MLD 135 via a wireless link 120-a using a first STA-AP pair and via a wireless link 120-b using a second STA-AP pair.

A non-AP MLD 130 and an AP MLD 135 may communicate via various radio frequency links, including a 2.4 GHz link, a 5 GHz link, and a 6 GHz link, which may generally be referred to as "sub-7 GHz links." In some systems, the 2.4 GHz link, the 5 GHz link, and the 6 GHz link may be relatively easy to access. For example, a non-AP MLD 130 and an AP MLD 135 may access or communicate using (such as transmit or receive via) any one or more of the 2.4 GHz link, the 5 GHz link, and the 6 GHz link without negotiating access on a different link, without an access constraint (such as an access constraint associated with a service type), or without applying techniques associated with mitigating propagation path loss (such as focusing transmission and reception in a specific direction via beamforming). Some other radio frequency links, however, may be associated with an access constraint or difficulty and, in some implementations, a non-AP MLD 130 and an AP MLD 135 may use any one or more of the 2.4 GHz link, the 5 GHz link, and the 6 GHz link to support and facilitate communications via such other radio frequency links.

Accordingly, in some aspects, the wireless communications system 100 may support techniques that enable wireless devices (e.g., AP MLD 135, non-AP MLD 130) to exchange information indicating whether beam training procedures are expected to be performed for a radio frequency link (e.g., Wi-Fi link, 60 GHz link), and, if a beam training procedure is expected to be performed, what level of beam training procedures should be performed. In particular, wireless devices may be able to completely refrain from performing beam training in some circumstances. Comparatively, when beam training is expected to be performed for the radio frequency link (e.g., Wi-Fi link, 60 GHz link) the wireless devices may indicate whether the devices are expected to perform a more precise (and therefore more power intensive) beam training procedure, or whether the devices can perform a less precise perform less precise (and therefore more power intensive) beam training procedure for the radio frequency link.

In some implementations, a relative quality of communications performed over a 60 GHz link may be used to determine whether a beam training procedure should be performed, or how precise (and therefore power intensive) of a beam training procedure should be performed. In other cases, information determined from other links, such as sub-7 GHz links, may be used to facilitate beam training procedures on the 60 GHz link. For example, position information and/or beam information determined using a sub-7 link may be used to determine whether (or what level of precision) of beam training procedures should be performed on the 60 GHz link.

In some aspects, the first radio frequency link (such as any one or more of the 2.4 GHz link, the 5 GHz link, or the 6 GHz link) may be referred to as a sub-7 GHz link, where a sub-7 GHz link may generally refer to any radio frequency link, or any collection of two or more radio frequency links, at or below 7 GHz. Further, as described herein, the second radio frequency link may refer to any radio frequency link associated with an access constraint or difficulty. Thus, the implementations described herein may be applicable to any radio frequency band or link that has constraints or rules in terms of which devices may obtain access, when devices may obtain access, or how far (in terms of a reachability distance) messaging can be transmitted via that radio frequency band or link.

Further, the devices of the wireless communications system 100 may support various possible configurations associated with operation at one or more radio frequencies (such as possible configurations for 45 GHz or 60 GHz operation). For example, depending on a radio configuration, a device (such as an AP 105, a STA 115, a non-AP MLD 130, or an AP MLD 135) may operate in accordance with a single link, single radio (SLSR) configuration according to which a single radio device may operate using one radio frequency (e.g., 60 GHz link), a multi-link, single radio (MLSR) configuration according to which a device may operate using one radio frequency band at a time (but may operate using both sub-7 GHz and 45 GHz or 60 GHz), or a multi-link, multi-radio (MLMR) configuration according to which a device may operate on more than one band simultaneously (with at least one radio operating using a sub-7 GHz band). In accordance with the implementations described herein, an MLD may support an MLSR or an MLMR configuration. As such, the described techniques may apply for devices that can communicate via multiple links simultaneously or devices that can communicate via different links at different times.

Further, although described herein as a non-AP MLD 130, a non-AP MLD 130 may function as a soft AP device (which may be referred to as a soft AP device). In such examples in which the non-AP MLD 130 functions as a soft AP device, the non-AP MLD 130 may perform the same or similar functions (such as transmit or receive the same or similar signaling) as the AP MLD 135 to one or more other STAs 115 or to one or more other non-AP MLDs 130. If operating as a soft AP device, which may be a device that operates using a battery or an otherwise limited power supply (or in a power save mode), the non-AP MLD 130 may use a same set of radio frequency chains for soft AP device operation as used for operation as a non-AP MLD 130. Further, although referred to herein as a soft AP device, such a device may be any client device (such as any battery powered client device) that functions as an AP MLD 135.

Figure 2:
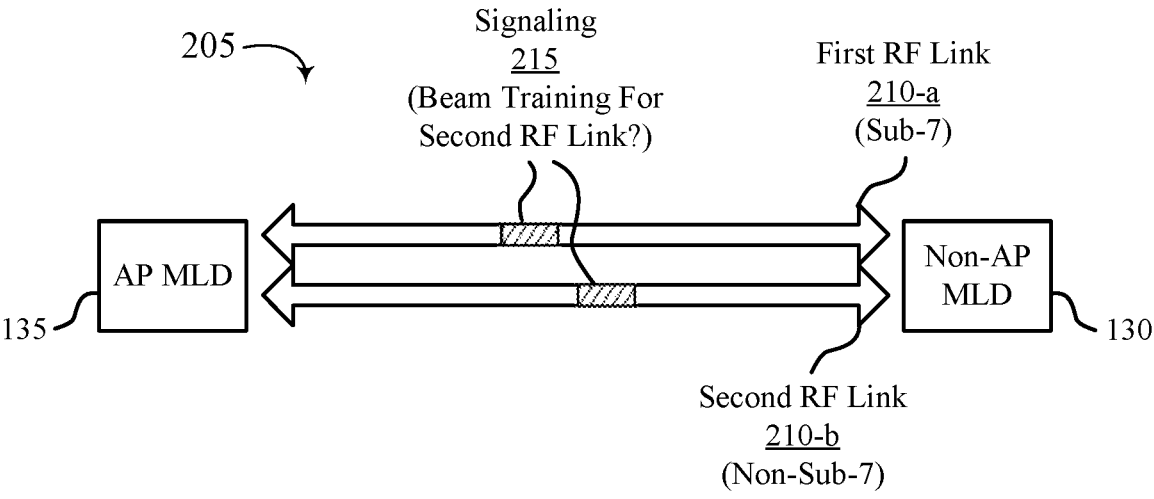
FIG. 2 illustrates an example of a wireless communications system that supports beamforming techniques in Wi-Fi frequency bands in accordance with one or more aspects of the present disclosure.
Figure 2:
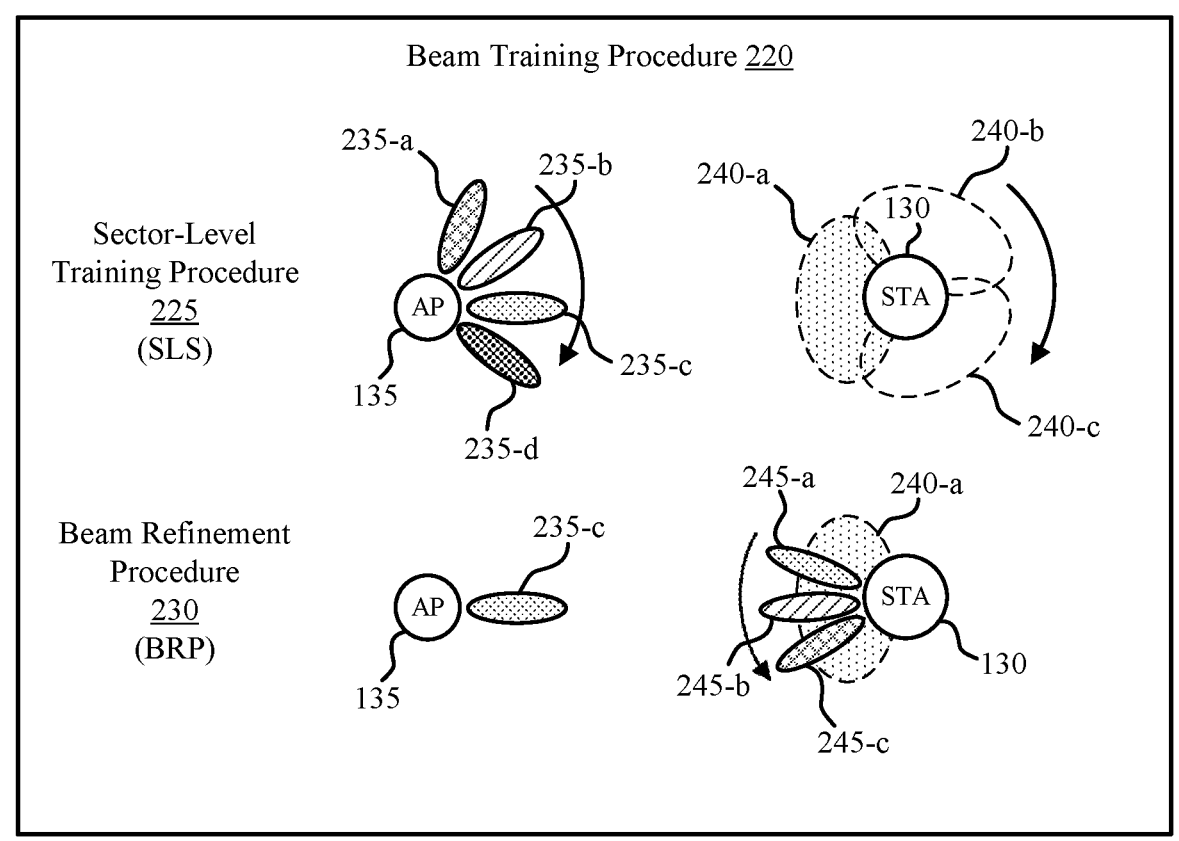

FIG. 2 illustrates an example of a wireless communications system 200 that supports beamforming techniques in Wi-Fi frequency bands in accordance with one or more aspects of the present disclosure. Aspects of the wireless communications system 200 may implement, or be implemented by, aspects of the wireless communications system 100. For example, the wireless communications system 200 illustrates communication between a non-AP MLD 130 and an AP MLD 135, which may be examples of the non-AP MLD 130 and the AP MLD 135, respectively, as illustrated by and described with reference to FIG. 1.

In some implementations, the non-AP MLD 130 and the AP MLD 135 may communicate via a communication link 205. In some implementations, the communication link 205 may include one or more different links. For example, in some implementations, the communication link 205 may include a first radio frequency link 210-a (e.g., a sub-7 link such as any one or more of a 2.4 GHz link, a 5 GHz link, or a 6 GHz link) and a second radio frequency link 210-b (e.g., a non-sub-7 link such as a 45 GHz link, or a 60 GHz link). In this example, the first radio frequency link 210-a (e.g., sub-7 link) may support communications performed via the second radio frequency link 210-b (e.g., non-sub-7 link). In other words, the first radio frequency link 210-a may serve as an anchor or stable link that is used to facilitate communications via the second radio frequency link 210-b.

Moreover, in some aspects, a 60 GHz link may be part of an MLO setup involving sub7 link(s). In other words, the AP operating on 60 GHz may be affiliated with the AP MLD 135 that has at least one other AP operating on a sub-7 link. In some implementations, aspects of the present disclosure are directed to utilizing sub-7 links as anchor links to facilitate operations on 60 GHz links, and to reduce management frame overhead. In other words, as will be described in further detail herein, aspects of the present disclosure are directed to utilizing the MLO framework to facilitate operations on a non-sub-7 link, such as a 45 GHz or 60 GHz link.

In some wireless communications systems, wireless communications within a 60 MHz band may be performed within repeating beacon intervals (BIs). Each BI may include a beacon header interval (BHI) and a data transmission interval (DTI). A BHI may include three sub-intervals, including a beacon transmission interval (BTI), an association beamforming training (A-BFT) interval, and an announcement transmission interval (ATI). During the BTI, an AP 105, an AP MLD 135, or a personal basic service set control point (PCP) may transmit multiple directional beacons (e.g., beacon frames). During the A-BFT, one or more STAs 115 or non-AP MLDs 130 may perform beam training for communication with an AP 105, AP MLD 135, or PCP. Lastly, during the ATI, an AP 105, AP MLD 135, or PCP may exchange management frames with associated and beam trained STAs 115 or non-AP MLDs 130.

The DTI of a BI may include one or more contention-based access periods (CBAPs) or scheduled SPs, or a combination of the two, for exchanging data frames. For example, a DTI may include a CBAP or SP frame, a CBAP or SP frame, and a CBAP or SP frame. SPs may be dynamic or pseudo-static. In some aspects, a DTI may be a useful portion of time in the BI during which actual data transmission between devices may occur.

Some radio frequency bands (such as a 45 GHz or 60 GHz band) may provide a large amount of communication resources (such as a large swath of spectrum) that communicating devices (such as Wi-Fi devices) may use. Operation on relatively higher radio frequency bands (such as 45 GHz or 60 GHz bands) may present several challenges at a device or system level, which may lead to a lack of widespread adoption of the 45 GHz or 60 GHz band for data communications.

For example, transmissions within 45 GHz or 60 GHz bands may suffer from high propagation loss (e.g., high attenuation). As such, omnidirectional transmissions (e.g., non-beamformed transmissions) will not travel far. As a result, wireless devices may be required to perform directional transmissions to take advantage of beamforming antenna gains to form a narrow beam towards the intended peer device. Stated differently, wireless devices communicating within non-sub-7 bands may be required to focus transmissions and receptions to narrow beams in order for the transmissions to reach the intended receivers.

Beam training procedures 220 may be performed to identify narrow beams used to perform beamforming communications. During a beam training procedure, transmission/reception planes at a transmitting/receiving devices may be divided up into several sectors, where the wireless devices are configured to identify narrow Tx/Rx beams within a sector that will be used for beamformed communications. Some beam training procedures 220 (e.g., beam training procedures defined by 802.11ad/ay) may include two steps or phases: (1) a sector-level sweep (SLS) phase (e.g., sector-level training procedure 225), and (2) a beam refinement phase (BRP) (e.g., beam refinement procedure 230).

While the terms "SLS" and "BRP" (and like terms) are the terms used and defined in 802.11ad/ay, it is noted herein that different terminology may be used to refer to the different steps of a beam training procedure. In particular, future generations of Wi-Fi may adopt different words or phrases that are used to refer to the respective steps of a beam training procedure. Moreover, future generations of Wi-Fi may include additional or alternative steps/phases of a beam training procedure. However, aspects of the present disclosure, which enable wireless devices to skip beam training procedures or perform less-intensive beam training procedures, may be implemented for both the current beam training framework, as well as future beam training framework with additional and/or alternative steps/phases.

During an SLS phase (e.g., sector-level training procedure 225) of a beam training procedure 220, the wireless devices sweep across sectors/wide beams (e.g., quasi-omnidirectional beams, such as wide beams 240) to determine a general direction of a peer device, and identify wide beams 240 that may be used to communicate with the peer device (e.g., identify a sector corresponding to the peer device). In other words, during SLS, each wireless device (e.g., AP, STA, AP MLD 135, non-AP MLD 130) may take turns transmitting a short frame on each sector at the respective device, while the other side listens in a quasi-omnidirectional or omnidirectional mode to help establish a general direction of where the peer wireless device is located.

Comparatively, during the BRP (e.g., beam refinement procedure 230) of the beam training procedure 220, the wireless devices sweep across narrow beams (e.g., beams 245 that are narrower than the wide beams 240 used in SLS) within the sector/wide beam 240 found during the SLS phase, and identify narrow beams 245 within the identified sector/wide beam 240 that will be used to communicate with the peer device. In other words, the BRP may follow the SLS to further refine the beam information that will be used for wireless communications. Additionally, or alternatively, BRP may be run independently (e.g., without) the SLS to establish a narrow beam directed towards a peer device.

However, such beam training procedures 220 are complex, time consuming, and result in large control signaling overhead. In particular, some beam training procedures 220 require multiple (directional) beacon transmissions during a BTI. Additionally, an unassociated STA may be expected to beam-train before sending an association request frame to the intended AP (e.g., during A-BFT). Further, wireless devices may be expected to perform beam training at regular or irregular intervals post-association to maintain high throughput between the respective devices, therefore introducing frequency beam training procedures 220, increasing signaling/training overhead, and reducing useful medium time that may be used for communications between the respective devices. Moreover, beam training procedures 220 may be utilized in both sub-7 bands and non-sub-7 bands band to identify beams within the respective beams 235, 245 that exhibit sufficient performance and are less susceptible to propagation loss. However, performance of multiple beam training procedures 220 for different bands may be time consuming, and may increase power consumption at the wireless devices.

Accordingly, aspects of the present disclosure are directed to techniques that enable wireless devices (e.g., AP MLD 135, non-AP MLD 130) to exchange information indicating whether beam training procedures 220 are expected to be performed for a radio frequency link 210 (e.g., Wi-Fi link, 60 GHz link), and, if a beam training procedure 220 is expected to be performed, what level of beam training procedures 220 should be performed. In particular, the AP MLD 135 and the non-AP MLD 130 may be able to completely refrain from performing beam training in some circumstances. Comparatively, when beam training is expected to be performed for the second radio frequency link 210-b (e.g., Wi-Fi link, 60 GHz link) the AP MLD 135 and the non-AP MLD 130 may indicate whether the devices are expected to perform a more precise (and therefore more power intensive) beam training procedure 220, or whether the devices can perform a less precise perform less precise (and therefore more power intensive) beam training procedure 220 for the second radio frequency link 210-b.

Aspects of the present disclosure may utilize MLO framework to facilitate operations on non-sub-7 frequency bands, such as a 45 GHz or 60 GHz band, where the non-sub-7 band may be part of an MLO setup involving a sub-7 link. In particular, in accordance with some aspects of the present disclosure, an MLO framework may enable an AP MLD 135 to perform basic operations (such as time synchronization, receiving traffic indication, receiving critical updates indication, etc.) by monitoring a single link, such as a sub-7 link, to facilitate wireless communications on non-sub-7 links. As such, some aspects, of the present disclosure may reduce or eliminate the need for wireless devices to monitor beacons on non-sub-7 links for performing basis basic service set (BSS) operations.

In particular, as described herein, full beam training procedures 220 may include two phases (SLS and BRP) that require two peer devices to each perform short transmissions across each of its sectors (e.g., sector sweep). However, sectorized beacons may aid wireless devices to make decisions on whether or not to perform beam training. With sectorized beaconing, the sector sweep at the AP MLD 130 may be performed, where the AP MLD 135 may determine if beam training is needed or not, and, if needed, whether to perform full beam training (e.g., SLS and BRP) or refinement-only (e.g., only BRP) based on a strength of the received beacon on the expected sector. Thus, sectorized beacons and BTIs described herein may enable more efficient beam training techniques.

Stated differently, aspects of the present disclosure may be used to determine whether beam training procedures 220 are required/expected for non-sub-7 links, which may reduce the frequency with which beam training procedures 220 are performed, and/or reduce the time and power consumption used to perform beam training procedures 220. In particular, techniques herein may be used between wireless devices to determine whether the wireless devices can completely skip performing a beam training procedure 220 for a radio frequency link 210, such as a 60 GHz link (e.g., second radio frequency link 210-b). Additionally, if the wireless devices determine that a beam training procedure 220 is required, techniques described herein may be used by the wireless devices to determine whether a full beam training procedure 220 (e.g., beam training including SLS and BRP) is required, or if the wireless devices can perform a truncated or shortened beam training procedure 220 (e.g., beam training including only BRP).

For example, referring to FIG. 2, the non-AP MLD 130 and the AP MLD 135 may communicate with one another via a first radio frequency link 210-a associated with a first frequency band. In some cases, the first frequency band associated with the first radio frequency link 210-a may include a sub-7 frequency band, such as a 2.4 GHz band or a 5 GHz band. In some implementations, the non-AP MLD 130 and the AP MLD 135 may perform a beam training procedure 220 associated with the first radio frequency link 210-a in order to identify beams used to communicate with one another via the first radio frequency link 210-a.

In some aspects, the non-AP MLD 130, the AP MLD 135, or both, may determine position information, beam information, or both, associated with the respective wireless devices. That is, the wireless devices may determine position information (e.g., relative geographical positions) associated with the non-AP MLD 130, the AP MLD 135, or both, and/or may determine Tx/Rx beams used by the non-AP MLD 130, the AP MLD 135. The wireless devices may determine the position information and/or the beam information based on performing communications via the first radio frequency link 210-a.

For example, the wireless devices may determine relative geographical positions of the respective devices and/or Tx/Rx beams used by the respective devices based on communicating with one another via the sub-7 link. For example, STA instances (e.g., non-AP MLD 130) may perform angle of arrival (AoA) measurements (and/or other types of measurements/procedures) on the sub-7 link to determine the general direction (e.g., coarse estimate of the sector(s)) of the peer device (e.g., AP MLD 135). In some implementations, as will be described in further detail herein, the position information and/or beam information associated with the respective devices and/or first radio frequency link 210-a may be used to determine whether a beam training procedure 220 should be performed for a second radio frequency link 210-b and, if a beam training procedure 220 is needed, what type or level of beam training should be performed. In other words, the coarse estimate of the sector(s) of the peer device determined on a sub-7 link may be used as an alternative to performing SLS on a 60 GHz link, which may eliminate overhead associated with performance of SLS for the 60 GHz link.

The non-AP MLD 130 and the AP MLD 135 may establish a second radio frequency link 210-b. The second radio frequency link 210-b may be associated with a second frequency band that is different from the first frequency band associated with the first radio frequency link 210-a. For example, the second radio frequency link 210-b may include a non-sub-7 link associated with a frequency band above 7 GHz, such as a 45 GHz band or a 60 GHz band. As noted previously herein, in some implementations, the first radio frequency link 210-a (e.g., the sub-7 link) may serve as a stable anchor link that is used to facilitate communications and operations (e.g., beam training procedure 220) for the second radio frequency link 210-b (e.g., the non-sub-7 link). In this regard, the wireless devices may establish the second radio frequency link 210-b as part of a MLO scheme.

In some aspects, non-AP MLD 130, the AP MLD 135, or both, may perform measurements on communications performed via the second radio frequency link 210-*b*. For example, the non-AP MLD 130 may perform measurements on signals received from the AP MLD 135 via the second radio frequency link 210-*b*. Measurements performed on the second radio frequency link 210-*b* may include, but are not limited to, RSSI measurements, RSRP measurements, RSRQ measurements, SNR measurements, SINR measurements, and the like. In some implementations, as will be described in further detail herein, the relative quality of the second radio frequency link 210-*b* (as determined by the measurements performed for the second radio frequency link 210-*b*) may be used to determine whether a beam training procedure 220 should be performed for the second radio frequency link 210-*b* and, if a beam training procedure 220 is needed, what type or level of beam training should be performed.

In cases in which the respective wireless devices are associated and active state on the second radio frequency link 210-*b* (e.g., 60 GHz link), the non-AP MLD 130 that is in the associated state with the 60 GHz link and has an active session with the AP MLD 135 may be expected to at least occasionally perform measurements to refine Tx/Rx beams (where frequency may be based on mobility) to maintain a sufficient MCS over the second radio frequency link 210-*b*.

For example, in the context of an associated non-AP MLD 130 with active frame exchange, the AP MLD 130 may transmit beacons via beams 235 during a BTI as initiator-side sweep for the 60 GHz link. In this example, the associated non-AP MLD 130 that has recently exchanged frames with the AP MLD 135 on the 60 GHz link may listen (e.g., monitor) for beacon frames during the BTI using one or more wide beams 240 in a quasi-omnidirectional mode, such as a wide beam 240 in a beamformed sector that was most recently used for exchanging frames with the AP MLD 135. For instance, the AP MLD 135 may sweep across beams 235-*a*, 235-*b*, 235-*c*, and/or 235-d, and the non-AP MLD 130 may monitor for beacons within the wide beam 240-*a* that was recently used for communicating with the AP MLD 135 via the second radio frequency link 210-*b*. The non-AP MLD 130 may perform measurements (e.g., RSSI measurements) on received beacons, and may determine whether (and/or what type/extent) of beam training procedure 220 is required based on the measurements. For instance, if a beacon frame is received with an RSSI above a certain RSSI threshold, BRP may not be needed, and the wireless devices may skip or refrain from performing a beam training procedure 220 for the second radio frequency link 210-*b*. Comparatively, if the beacon frames are received with RSSI below the RSSI threshold, the non-AP MLD 130 may initiate a beam training procedure 220 (e.g., via signaling 215) during a next D-SP.

In some aspects, the non-AP MLD 130, the AP MLD 135, or both, may communicate signaling 215 indicating whether or not a beam training procedure 220 is expected to be performed for the second radio frequency link 210-*b*. Moreover, in cases where a beam training procedure 220 is expected to be performed for the second radio frequency link 210-*b*, the signaling 215 may indicate what type or level of beam training procedure 220 is to be performed. As shown in FIG. 2, the signaling 215 may be communicated between the respective devices via the first radio frequency link 210-*a* (e.g., sub-7 link), the second radio frequency link 210-*b* (e.g., non-sub-7 link), or both.

In some implementations, the frequency and intensity (e.g., type) of beam training procedure 220 performed for the second radio frequency link 210-*b* may be based on the scenario. Different scenarios which may result in different frequencies/intensities of beam training procedures may include: (1) the non-AP MLD 130 is an associated and active state on the 60 GHz link, (2) the non-AP MLD 130 is an associated and idle state on the 60 GHz link, and (3) the non-AP MLD 130 established a new association on the 60 GHz link.

For example, the signaling 215 may indicate for the wireless devices to skip performance of a beam training procedure 220 for the second radio frequency link 210-*b*, or may indicate a selection between a first beam training procedure 220 and a second beam training procedure 220. In this example, the first beam training procedure 220 may include only a beam refinement procedure 230 (e.g., BRP without SLS), and the second beam training procedure 220 may include a sector-level training procedure 225 (e.g., SLS, or sector-level sweep) and a beam refinement procedure 230 (e.g., SLS+BRP).

The wireless devices may transmit/receive the signaling 215 indicating whether or not (and what type/extent) of beam training procedure 220 is expected for the second radio frequency link 210-*b* based on communicating via the first radio frequency link 210-*a*, determining the beam/position information, establishing the second radio frequency link 210-*b*, performing the measurements for the second radio frequency link 210-*b*, or any combination thereof. In some implementations, the AP MLD 135, the non-AP MLD 130, or both, may indicate a need for performing a beam training procedure 220 during a D-SP via a field in the initiating frame of the signaling 215. A D-SP may include polling and response frames, in which the AP MLD 135 and the non-AP MLD 130 exchange messages (e.g., signaling 215) indicating whether either of the devices is to initiate a beam training procedure 220. Polling and response frames may include a trigger frame (e.g., poll) followed by a physical layer protocol data unit (PPDU) (e.g., response), such as a trigger-based PPDU (TB). Moreover, polling and response frames may include a new frame that is configured/defined for carrying out such poll-response, or some other existing frame extended to perform poll-response.

For example, one or more bits in a trigger frame of signaling 215 transmitted by the AP MLD 135 may indicate to perform a beam training procedure 220 including a sector-level training procedure 225, a beam refinement procedure 230, or both. By way of another example, one or more bits in a TB of the signaling 215 transmitted by the non-AP MLD 130 may indicate to perform a beam training procedure 220 including a sector-level training procedure 225, a beam refinement procedure 230, or both. For instance, a first bit field value (e.g., "00") of the signaling 215 may indicate for the wireless devices to skip a beam training procedure 220, a second bit field value (e.g., "01") may indicate for the wireless devices to perform a beam training procedure 220 with only a beam refinement procedure 230 (e.g., to perform a beam refinement procedure without a sector-level training procedure 225), and a third bit field value (e.g., "11") may indicate for the wireless devices to perform a beam training procedure 220 with both a sector-level training procedure 225 and a beam refinement procedure 230.

In some implementations, the signaling 215 may indicate whether or not (and/or what type/extent) of beam training procedure 220 is to be performed based on a relative quality of the second radio frequency link 210-*b*. For example, in cases where the second radio frequency link 210-*b* exhibits a sufficient quality (e.g., measurements that satisfy some threshold, such as RSSI≥Thresh), the signaling 215 may indicate that the wireless devices may skip performance of a beam training procedure 220 for the second radio frequency link, or may perform a less intensive beam training procedure 220 (e.g., beam training procedure 220 with only BRP). Comparatively, in cases where the second radio frequency link 210-*b* exhibits relatively poor quality (e.g., measurements that fail to satisfy some threshold, such as RSSI<Thresh), the signaling 215 may indicate that the wireless devices may perform a more intensive beam training procedure 220 (e.g., beam training procedure 220 with only SLS and BRP). In some implementations, the wireless devices may implement multiple different thresholds for determining whether (and what type/extend) of beam training procedures 220 are to be performed for the second radio frequency link 210-*b*.

As noted previously herein, the beacon frames received by the non-AP MLD 130 via the wide beam 240-*a* (corresponding to the sector recently used to communicate with the AP MLD 130) with RSSI below the RSSI threshold, the non-AP MLD 130 may initiate a beam training procedure 220 during a next D-SP via the signaling 215. Additionally, or alternatively, the AP MLD 135 may initiate a beam training procedure 220 during a D-SP via the signaling 215, such as based on a packet error rate (PER) or other criteria determined during a previous frame exchange.

By way of another example, the wireless devices may communicate the signaling 215 based on the position information and/or beam information determined based on the first radio frequency link 210-*a*. In other words, positioning operations (e.g., 11az) and/or radio frequency sensing operations (e.g., 11bf) may replace at least the sector-level training procedure 225 (SLS) of a beam training procedure 220 (e.g., beacon absent). In such cases, it may be assumed that all non-AP MLDs 130 and the AP MLD 135 support the positioning/radio frequency sensing operations (e.g., all associating STAs support 11az/11bf-based sector estimation). Moreover, the presence or absence of beacons (or equivalent frames) may be advertised during association. That is, if positioning/beam information determined via the first radio frequency link 210-*a* is used to enable the wireless devices to skip performance of a beam training procedure 220 for the second radio frequency link 210-*b*, the signaling 215 may be exchanged during the association for the second radio frequency link 210-*a* to indicate for the devices to skip the beam training procedure 220.

For example, beam information (e.g., Tx/Rx beams) used for communicating via the first radio frequency link 210-*a* may be used to determine beam information (e.g., Tx/Rx beams) that may be used for communicating via the second radio frequency link 210-*b*, and may thereby enable the wireless devices to skip performance of a beam training procedure for the second radio frequency link 210-*b*. Similarly, in cases where the respective wireless devices determine position information associated with the non-AP MLD 130 and/or the AP MLD 135 based on the first radio frequency link 210-*a*, the position information may be used to determine Tx/Rx beams for the second radio frequency link 210-*b*, and therefore be used to determine whether or not a beam training procedure 220 (and what type/extent of beam training procedure 220) should be performed for the second radio frequency link 210-*b*.

In other implementations, the wireless devices may be configured to perform a beam training procedure 220 for the second radio frequency link 210-*b* on-demand. That is, in some cases, the wireless devices may only perform a beam training procedure 220 for a non-sub-7 link only upon request from one of the respective devices. Stated differently, beaconing for a beam training procedure 220 for a 60 GHz link may be on-demand, where no beaconing is required (e.g., no beam training procedure 220) during idle conditions, and where an associated non-AP MLD 130 and/or an AP MLD 135 may indicate if beaconing (e.g., beam training procedure 220) for the 60 GHz link is needed.

For example, in some cases, the non-AP MLD 130 may transmit a request for a beam training procedure 220 for the second radio frequency link 210-*b* to the AP MLD 135. In this example, the AP MLD 135 may transmit the signaling 215 indicating the what type/extent of beam training procedure 220 is to be performed (e.g., indicating the selection between the first beam training procedure 220 and the second beam training procedure 220). Criteria for initiating a beam training procedure 220 on-demand may include, but are not limited to, scenarios where the non-AP MLD 130 comes out of inactivity and/or needs to perform training (e.g., perform initiator sweep during BTI). The signaling 215 to initiate on-demand training may be communicated on a sub-7 link and/or a non-sub-7 link (during D-SP).

In additional or alternative implementations, the wireless devices may indicate whether (or what type/extent) of beam training procedure 220 is to be performed based on other parameters or characteristics, such as a mobility state (e.g., topology) of the respective devices, previous operational states of the respective devices, or both.

For example, in cases where both the non-AP MLD 130 and the AP MLD 135 are relatively stationary (e.g., low mobility states, such as a screen-sharing configuration from a laptop to a screen in a conference room), the beams used for communications via the second radio frequency link 210-*b* may remain relatively constant. As such, the signaling 215 may indicate that the wireless devices can skip performance of a beam training procedure 220, or perform a less intensive beam training procedure 220 (e.g., perform only a beam refinement procedure 230). In other words, beam training (e.g., beaconing) may be turned off based on topology.

In high mobility use cases, it may not make sense to perform frequent beam training procedures 220, as the beams 235, 240 used by the respective devices may frequently change. Since traffic is at the MLD level, the two MLDs (e.g., AP MLD 135, non-AP MLD 130) may start frame exchange on the sub-7 link, and use the 60 GHz link on an opportunistic basis. For example, the AP MLD 135 may form a sharp beam 235 (e.g., less sectors) when communicating with a stationary device such as a TV (e.g., non-AP MLD 130), but may form a larger beam 235 (e.g., more sectors) when communicating with a mobile device such as laptop or a phone. As such, the frequency and/or type of beam training procedures 220 performed between the respective devices may be based on some form of adaptive learning (e.g., adaptive sectorization). In particular, the AP MLD 135 may change its beam characteristics based on the type of device or historical connections associated with the non-AP MLD 130 (e.g., low-mobility device or high-mobility device). Moreover, the topology/mobility states of the non-AP MLD 130 (e.g., mobile device, stationary device) may be signaled to the AP MLD 130 during association. Additionally, or alternatively, the AP MLD 135 may be configured to learn or store the information (e.g., a profile) associated with the non-AP MLD 130 based on previous interactions with the non-AP MLD 130.

Further, the type of beam training procedure 220 may be based on whether the non-AP MLD 130 is in an associated and idle state on a 60 GHz link. In particular, a non-AP MLD 130 in an idle state may turn off a 60 GHz radio to conserve power and may not monitor BTIs on the 60 GHz link. As such, over time (and due to mobility during the idle state), the beams at the respective devices (e.g., beams 235, 240) are likely to become misaligned. As such, in cases where the non-AP MLD 130 and/or the AP MLD 135 were previously operating in an idle or inactive state for some threshold duration of time, the signaling 215 may indicate that the wireless devices are expected to perform a some type of beam training procedure 220, such as a beam training procedure 220 including both a sector-level training procedure 225 and a beam refinement procedure 230. In particular, in some cases, a beam training procedure 220 including both a sector-level training procedure 225 and a beam refinement procedure 230 may be required or expected after a long period of inactivity on the 60 GHz link, or following association. Comparatively, if the 60 MHz link (e.g., second radio frequency link 210-b) between AP MLD 135 and the and non-AP MLD 130 is in frequent use, a beam training procedure 220 including only a beam refinement procedure 230 may be sufficient.

In the event of a new association on the 60 GHz link (e.g., second radio frequency link 210-b), whether or not beam training is expected may depend on how/where the association is performed. In cases where the non-AP MLD 130 establishes a new association for the 60 GHz link (e.g., second radio frequency link 210-b), the MLO setup may occur on the sub-7 link (e.g., first radio frequency link 210-a). As such, the non-AP MLD 130 may not be required or expected to beam form (e.g., perform a beam training procedure 220) for the 60 GHz link prior to association. Comparatively, a newly-associated non-AP MLD 130 (e.g., STA) may be expected to perform a beam training procedure on the 60 GHz link.

In cases where the signaling 215 indicates for the wireless devices to perform a beam training procedure 220, the wireless devices may perform a beam training procedure 220 for the second radio frequency link 210-b. For example, the wireless devices may perform one of a first beam training procedure 220 or a second beam training procedure 220 based on a selection between the first and second beam training procedures 220 indicated via the signaling 215.

As noted previously herein, the type and extent of beam training procedure 220 may vary in terms of time used to perform the respective procedures, the steps of the respective procedures, the power consumption associated with the respective procedures, and the relative accuracy/intensity of the respective procedures. For example, in some implementations, the first beam training procedure 220 may include a beam refinement procedure 230 (e.g., BRP but not SLS), and the second beam training procedure 220 may include a sector-level training procedure 225 and the beam refinement procedure 230 (e.g., SLS+BRP). In this regard, as compared to the first beam training procedure 220, the second beam training procedure 220 may be more intensive and require more time and power, but may be more accurate and precise for determining beams that will exhibit sufficient performance.

For example, as shown in FIG. 2 and in the context of a beam training procedure 220 including both a sector-level training procedure 225 and the beam refinement procedure 230 (e.g., SLS+BRP), the AP MLD 135 may transmit signals by sweeping across a set of narrow Tx beams 235 that are spatially separated across a set of Tx sectors, and the non-AP MLD 130 may sweep across a set of wide beams 240 that are spatially separated across a set of Rx sectors to identify a relative direction/sector of the respective peer device. For instance, as part of the sector-level training procedure 225, the non-AP MLD 130 may identify that the first wide beam 240-a is associated with a general direction of the AP MLD 135, and may transmit a message to the AP MLD 135 indicating the wide beam 240-a, the corresponding sector, the third narrow beam 235-c, or any combination thereof. Subsequently, as part of the beam training procedure 220, the devices may perform the beam refinement procedure 230 in which the AP MLD 135 transmit signals using the indicated beam 235-c, and the non-AP MLD 130 receives the signals by sweeping across a set of narrow beams 245 within the wide beam 240-a. Accordingly, following the beam refinement procedure 230, the wireless devices may determine that the best beams for communications via the second radio frequency link 210-b may include the narrow beam 235-c (Tx) and the narrow beam 245-b (Rx).

Comparatively, in the in the context of a beam training procedure 220 including only the beam refinement procedure 230 (e.g., BRP), the wireless devices may refrain from performing the sector-level training procedure 225, and may immediately perform the beam refinement procedure 230 (e.g., earlier than if the sector-level training procedure 225 were also performed), as described herein.

While FIG. 2 illustrates the beam training procedure 220 performed with the AP MLD 135 acting as the Tx device and the non-AP MLD 130 acting as the Rx device, the beam training procedure 220 may be performed in both directions so that each respective device is able to determine Tx and Rx beams used for communications via the second radio frequency link.

In some aspects, the non-AP MLD 130 and the AP MLD 135 may determine beams (e.g., Tx/Rx beams 235, 245) that will be used for communicating via the second radio frequency link 210-b. The respective devices may determine the beam(s) (e.g., narrow beams 235, 245) that will be used for communicating via the second radio frequency link 210-b based on communicating the signaling 215, and performing or skipping the beam training procedure 220.

For example, in cases where the wireless devices do not perform a beam training procedure 220 for the second radio frequency link 210-b (e.g., the beam training procedure 220 is skipped), the wireless devices may determine the Tx/Rx beams 235, 245 for the second radio frequency link 210-b based on previous beams used for the second radio frequency link 210-b, based on beam information associated with the first radio frequency link 210-a, and the like. In this regard, in cases where the wireless devices do not perform a beam training procedure 220 for the non-sub-7 link, the beams 235, 245 for the second radio frequency link 210-b may be determined by leveraging information and operations performed via the sub-7 link. As used herein, to "to skip performance of a beam training procedure," and like terms/phrases, may refer to not performing a beam training procedure 220, refraining from performing a beam training procedure 220, selecting a beam for communication independent of performing a beam training procedure 220, and/or selecting a beam for communication without performing a beam training procedure 220.

Comparatively, in cases where the wireless devices do perform a beam training procedure 220 for the second radio frequency link 210-b, the wireless devices may determine the Tx/Rx beams 235, 245 for the second radio frequency link 210-b based on the beam training procedure 220.

Subsequently, the non-AP MLD 130 and the AP MLD 135 may communicate one or more messages with one another via the second radio frequency link 210-b using the determined beam(s) 235, 245. In this regard, the wireless devices may communicate with one another based on communicating the signaling 215, performing or skipping the beam training procedure 220, determining the beams 235, 245 for the second radio frequency link 210-b, or any combination thereof.

Techniques described herein may facilitate more efficient beam training procedures 220 on non-sub-7 links. For example, techniques described herein may enable wireless devices to completely refrain from performing beam training procedures 220 on non-sub-7 links. Moreover, in cases where beam training is still expected to be performed on a non-sub-7 link, techniques described herein may enable the wireless devices to determine what level of precision/accuracy of beam training procedure 220 should be performed. As such, techniques described herein may reduce a frequency with which beam training procedures 220 are performed on non-sub-7 links. Further, when beam training procedures 220 are expected to be performed, techniques described herein may enable wireless devices to perform less intensive beam training procedures 220 in some instances, which may reduce the time and power consumption used to perform such beam training procedures 220. By reducing time and power consumption associated with beam training procedures 220 performed on non-sub-7 links, techniques described herein may improve battery life at wireless devices (e.g., non-AP MLDs 130), expedite communications over non-sub-7 bands, and improve overall user experience.

Figure 3:
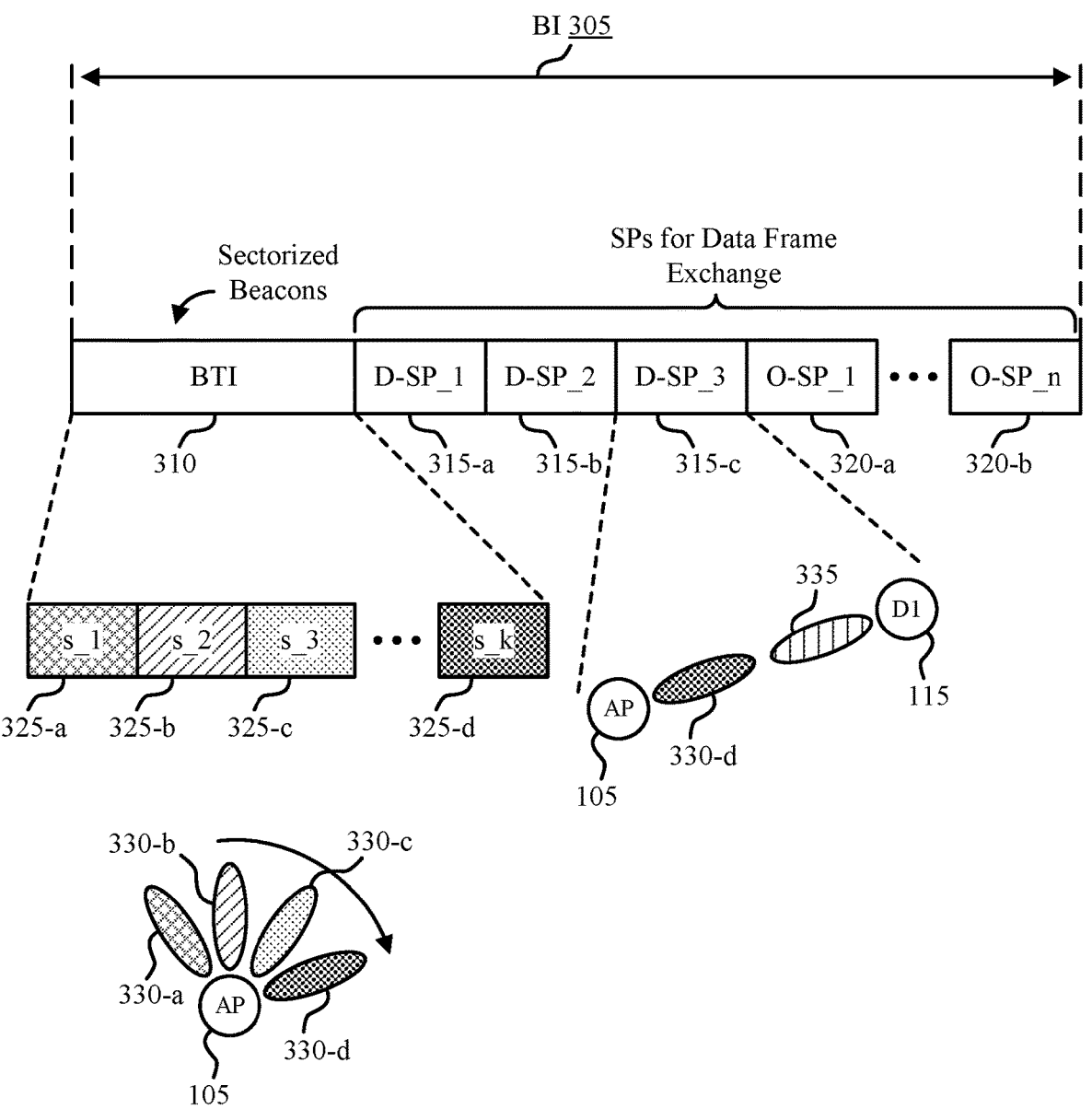
FIG. 3 illustrates an example of a beam training procedure that supports beamforming techniques in Wi-Fi frequency bands in accordance with one or more aspects of the present disclosure.

FIG. 3 illustrates an example of a beam training procedure 300 that supports beamforming techniques in Wi-Fi frequency bands in accordance with one or more aspects of the present disclosure. Aspects of the beam training procedure 300 may implement, or be implemented by, aspects of the wireless communications system 100, the wireless communications system 200, or both. For example, the beam training procedure 300 illustrates communication between a non-AP MLD 130 and an AP MLD 135, which may be examples of the non-AP MLD 130 and the AP MLD 135, respectively, as illustrated by and described with reference to FIG. 1.

For example, a STA 115 and an AP 105, or a non-AP MLD 130 and an AP MLD 135 (which may be an example of a STA 115 and an AP 105, or a non-AP MLD 130 and an AP MLD 135 as illustrated by or described with reference to FIGS. 1-2, respectively), may perform the beam training procedure 300 to measure a signal strength associated with one or more beam pairs and to select a beam pair associated with a suitable or greatest signal strength.

In some implementations, the beam training procedure 300 may be a beacon frame-based beam training procedure according to which communicating devices may perform beam training via one or more sectorized beacons. The beam training procedure 300 illustrated in FIG. 3 may include a BI 305 that is divided up into three parts: (1) a BTI 310, (2) dedicated service periods (D-SPs 315), and (3) opportunistic service periods (O-SPs 320).

For example, a BI 305 may include a BTI 310 during which an AP 105 may transmit sectorized beacons in different beamformed directions during different beam training resources 325 (which may generally refer to any one or more of a beam training resource 325-a, a beam training resource 325-b, a beam training resource 325-c, and a beam training resource 325-d). In other words, the AP 105 may perform a sector sweep (e.g., SLS) of short beacon frames during the BTI 310. The beacon fames may include short frames that STAs may use as a reference for evaluating if beam training is needed or not.

For instance, as shown in FIG. 3, a beam training resource 325-a may be associated with a directional beam 330-a (which may be denoted as s 1) and the AP 105 may accordingly transmit a sectorized beacon frame during the beam training resource 325-a using the directional beam 330-a. Similarly, the beam training resource 325-b may be associated with a directional beam 330-b (which may be denoted as s 2), the beam training resource 325-c may be associated with a directional beam 330-c (which may be denoted as s 3), and the beam training resource 325-d may be associated with a directional beam 330-d (which may be denoted as s k). As such, the AP 105 may sweep across a set of directional beams 330 (which may generally refer to any one or more of the directional beam 330-a, the directional beam 330-b, the directional beam 330-c, or the directional beam 330-d) during the BTI 310. A STA 115 may measure the various directional beams 330 used by the AP 105 using a and identify a suitable beam pair that the AP 105 and the STA 115 may use for exchanging data. Accordingly, the AP 105 and the STA 115 may communicate data during an SP for data frame exchange using the suitable beam pair.

For example, the STA 115 and the AP 105 may communicate during one or more of a D-SP 315-a, a D-SP 315-b, and a D-SP 315-c using the suitable beam pair. Additionally, or alternatively, the STA 115 and the AP 105 may perform beam training during any one or more of the D-SP 315-a, the D-SP 315-b, and the D-SP 315-c. As illustrated by the beam training procedure 300, the AP 105 may use the directional beam 330-d and the STA 115 may use a directional beam 335 during the D-SP 315-c. The STA 115 and the AP 105 also may communicate during one or more open SPs (O-SPs) 320 (which may generally refer to any one or more of an O-SP 320-a and an O-SP 320-b).

In accordance with the implementations described herein, a non-AP MLD 130 (or a STA 115 associated with a non-AP MLD 130) and an AP MLD 135 (or an AP 105 associated with an AP MLD 135) may perform the beam training procedure 300 using a 60 GHz link in scenarios in which the non-AP MLD 130 and the AP MLD 135 support 60 GHz link beacon frames. In some implementations, the non-AP MLD 130 and the AP MLD 135 may conditionally support beacon frame transmissions using the 60 GHz link. For example, the AP MLD 135 may transmit one or more sectorized beacon frames to the non-AP MLD 130 using the 60 GHz link in accordance with a satisfaction of a condition associated with 60 GHz link beacon frame transmissions.

The beam training procedure 300 illustrated in FIG. 3 may be used to illustrate beam training procedures performed between wireless devices following a new association, or a beam training procedure performed between wireless devices after one of the wireless devices has resumes after a long idle period. In particular, different steps of a beam training procedure (e.g., sector-level training procedure 225 (SLS), beam refinement procedure 230 (BRP)) may be performed during different portions of the BI 305 illustrated in FIG. 3.

For example, in accordance with a first implementation, an STA (e.g., non-AP MLD 130) may monitors several BTIs 310 in a quasi-omnidirectional mode to determine the general location of the AP MLD 135, and may performs responder-side SLS and BRP during an associated D-SP 315. In this regard, the AP MLD 130 may transmit signals as part of the SLS during the BTI(s) 310, and the non-AP MLD 130 may transmit signals as part of the SLS during D-SPs 315, where the BRP is performed during the D-SP(s) 315. Stated differently, the non-AP MLD 130 may receive signals as part of the sector-level training procedure 225 using a wide beam 240 within one or more BTIs 310, and may transmit signals as part of the sector-level training procedure 225 during one or more D-SPs 315. One drawback of this implementation is that the beam training procedure 300 may take place over several BTIs 310, which may result in longer beam training. However, such delay may be acceptable for use cases that do not require frames to be exchanged on 60 GHz immediately after association.

By way of another example, in accordance with a second implementation, the AP MLD 130 and the non-AP MLD 130 (STA) may perform both SLS and BRP during the D-SP 315. In this implementation, a portion of the D-SP 315 (after association or after returning from idle state) may be used towards beam training.

Figure 4:
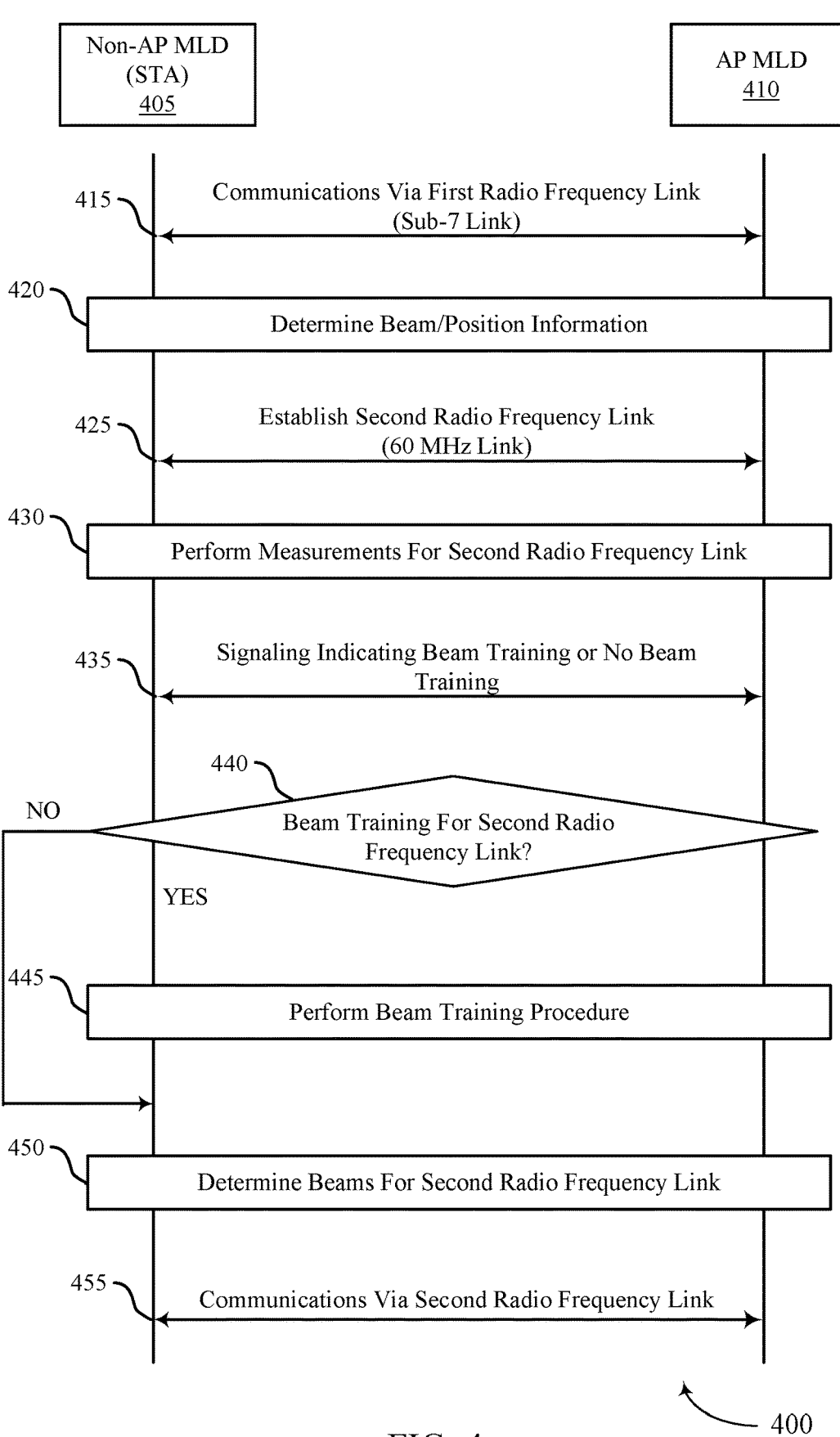
FIG. 4 illustrates an example of a process flow that supports beamforming techniques in Wi-Fi frequency bands in accordance with one or more aspects of the present disclosure.

FIG. 4 illustrates an example of a process flow 400 that supports beamforming techniques in Wi-Fi frequency bands in accordance with one or more aspects of the present disclosure. Aspects of the process flow 400 may implement, or be implemented by, aspects of the wireless communications system 100, the wireless communications system 200, the beam training procedure 300, or any combination thereof. For example, the process flow 400 illustrates signaling between a non-AP MLD 405 and an AP MLD 410 that may be used to determine whether (or what type/extent) of beam training procedures are expected to be performed for a radio frequency link, such as a 60 GHz link, as shown and described with respect to FIGS. 1-3.

The process flow 400 may include a non-AP MLD 405 and an AP MLD 410, which may be examples of non-AP MLDs 130, AP MLDs 135, STAs, and other wireless devices described with reference to FIGS. 1-3. For example, the non-AP MLD 405 and the AP MLD 410 illustrated in FIG. 4 may include examples of the non-AP MLD 130 and the AP MLD 135, respectively, as illustrated in FIG. 2.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 415, the non-AP MLD 405 and the AP MLD 410 may communicate (e.g., send and/or receive information) with one another via a first radio frequency link associated with a first frequency band. In some cases, the first frequency band associated with the first radio frequency link may include a sub-7 frequency band, such as a 2.4 GHz band or a 5 GHz band. In some implementations, the non-AP MLD 405 and the AP MLD 410 may perform a beam training procedure associated with the first radio frequency link in order to identify beams used to communicate with one another via the first radio frequency link.

At 420, the non-AP MLD 405, the AP MLD 410, or both, may determine position information, beam information, or both, associated with the respective wireless devices. That is, the wireless devices may determine position information (e.g., relative geographical positions) associated with the non-AP MLD 405, the AP MLD 410, or both, and/or may determine Tx/Rx beams used by the non-AP MLD 405, the AP MLD 410. The wireless devices may determine the position information and/or the beam information at 420 based on the communications via the first radio frequency link performed at 415. For example, the wireless devices may determine relative geographical positions of the respective devices and/or Tx/Rx beams used by the respective devices based on communicating with one another via the sub-7 link at 415. In some implementations, as will be described in further detail herein, the position information and/or beam information associated with the respective devices and/or first radio frequency link may be used to determine whether a beam training procedure should be performed for a second radio frequency link and, if a beam training procedure is needed, what type or level of beam training should be performed.

At 425, the non-AP MLD 405 and the AP MLD 410 may establish a second radio frequency link. The second radio frequency link may be associated with a second frequency band that is different from the first frequency band associated with the first radio frequency link. For example, the second radio frequency link may include a non-sub-7 link associated with a frequency band above 7 GHz, such as a 45 GHz band or a 60 GHz band. As noted previously herein, in some implementations, the first radio frequency link (e.g., the sub-7 link) may serve as a stable anchor link that is used to facilitate communications and operations (e.g., beam training procedures) for the second radio frequency link (e.g., the non-sub-7 link). In this regard, the wireless devices may establish the second radio frequency link as part of a MLO scheme.

At 430, the non-AP MLD 405, the AP MLD 410, or both, may perform measurements on communications performed via the second radio frequency link established at 425. For example, the non-AP MLD 405 may perform measurements on signals received from the AP MLD 410 via the second radio frequency link. Measurements performed on the second radio frequency link may include, but are not limited to, RSSI measurements, RSRP measurements, RSRQ measurements, SNR measurements, SINR measurements, and the like. In some implementations, as will be described in further detail herein, the relative quality of the second radio frequency link (as determined by the measurements at 430) may be used to determine whether a beam training procedure should be performed for the second radio frequency link and, if a beam training procedure is needed, what type or level of beam training should be performed.

At 435, the non-AP MLD 405, the AP MLD 410, or both, may communicate (e.g., send and/or receive) signaling indicating whether or not a beam training procedure is expected to be performed for the second radio frequency link. Moreover, in cases where a beam training procedure is expected to be performed for the second radio frequency link, the signaling may indicate what type or level of beam training procedure is to be performed. The signaling may be communicated between the respective devices via the first radio frequency link (e.g., sub-7 link), the second radio frequency link (e.g., non-sub-7 link), or both.

For example, the signaling may indicate for the wireless devices to skip performance of a beam training procedure for the second radio frequency link, or may indicate a selection between a first beam training procedure and a second beam training procedure. In this example, the first beam training procedure may include only a beam refinement procedure (e.g., BRP), and the second beam training procedure may include a sector-level training procedure (e.g., SLS, or sector-level sweep) and a beam refinement procedure.

The wireless devices may transmit/receive the signaling indicating whether or not (and what type/extent) of beam training procedure is expected for the second radio frequency link at 435 based on communicating via the first radio frequency link at 415, determining the beam/position information at 420, establishing the second radio frequency link at 425, performing the measurements at 430, or any combination thereof.

For example, in cases where the second radio frequency link exhibits a sufficient quality (e.g., measurements that satisfy some threshold, such as RSSI≥Thresh), the signaling may indicate that the wireless devices may skip performance of a beam training procedure, or may perform a less intensive beam training procedure (e.g., beam training procedure with only BRP). Comparatively, in cases where the second radio frequency link exhibits relatively poor quality (e.g., measurements that fail to satisfy some threshold, such as RSSI<Thresh), the signaling may indicate that the wireless devices may perform a more intensive beam training procedure (e.g., beam training procedure with only SLS and BRP). In some implementations, the wireless devices may implement multiple different thresholds for determining whether (and what type/extend) of beam training procedures are to be performed for the second radio frequency link.

By way of another example, the wireless devices may communicate the signaling at 435 based on the position information and/or beam information determined at 420. For example, beam information (e.g., Tx/Rx beams) used for communicating via the first radio frequency link may be used to determine beam information (e.g., Tx/Rx beams) that may be used for communicating via the second radio frequency link. Similarly, in cases where the respective wireless devices determine position information associated with the non-AP MLD 405 and/or the AP MLD 410 based on the first radio frequency link, the position information may be used to determine Tx/Rx beams for the second radio frequency link, and therefore be used to determine whether or not beam training procedures (and what type/extent of beam training procedures) should be performed for the second radio frequency link.

In other implementations, the wireless devices may be configured to perform a beam training procedure for the second radio frequency link on-demand. That is, in some cases, the wireless devices may only perform a beam training procedure for a non-sub-7 link only upon request from one of the respective devices. For example, in some cases, the non-AP MLD 405 may transmit a request for a beam training procedure for the second radio frequency link to the AP MLD 410. In this example, the AP MLD 410 may transmit the signaling at 435 indicating the what type/extent of beam training procedure is to be performed (e.g., indicating the selection between the first beam training procedure and the second beam training procedure).

In additional or alternative implementations, the wireless devices may indicate whether (or what type/extent) of beam training procedure is to be performed based on other parameters or characteristics, such as a mobility state of the respective devices, previous operational states of the respective devices, or both. For example, in cases where both the non-AP MLD 405 and the AP MLD 410 are relatively stationary (e.g., low mobility states), the beams used for communications via the second radio frequency link may remain relatively constant. As such, the signaling at 435 may indicate that the wireless devices can skip performance of a beam training procedure, or perform a less intensive beam training procedure (e.g., perform only a beam refinement procedure). By way of another example, in cases where the non-AP MLD 405 and/or the AP MLD 410 were previously operating in an idle or inactive state for some threshold duration of time, the signaling may indicate that the wireless devices are expected to perform a some type of beam training procedure, such as a beam training procedure including both a sector-level training procedure and a beam refinement procedure.

At 440, the non-AP MLD 405 and the AP MLD 410 may determine whether (and what type/extent of) a beam training procedure is expected to be performed for the second radio frequency link. In particular, the respective devices may determine whether (and what type/extent) of beam training procedure is expected to be performed for the second radio frequency link based on the signaling at 435.

In cases where the wireless devices are not expected to perform a beam training procedure for the second radio frequency link (Step 440=NO), the process flow 400 may proceed to 450. Comparatively, in cases where the wireless devices are expected to perform some type of beam training procedure for the second radio frequency link (Step 440=YES), the process flow 400 may proceed to 445.

At 445, the non-AP MLD 405 and the AP MLD 410 may perform a beam training procedure for the second radio frequency link. In particular, the wireless devices may perform a beam training procedure based on the signaling at 435. For example, the wireless devices may perform one of a first beam training procedure or a second beam training procedure based on a selection between the first and second beam training procedures indicated via the signaling at 435.

As noted previously herein the type and extent of beam training procedures may vary in terms of time used to perform the respective procedures, the steps of the respective procedures, the power consumption associated with the respective procedures, and the relative accuracy/intensity of the respective procedures. For example, in some implementations, the first beam training procedure may include a beam refinement procedure (e.g., BRP), and the second beam training procedure may include a sector-level beam training procedure and the beam refinement procedure (e.g., SLS+BRP). In this regard, as compared to the first beam training procedure, the second beam training procedure may be more intensive and require more time and power, but may be more accurate and precise for determining beams that will exhibit sufficient performance.

At 450, the non-AP MLD 405 and the AP MLD 410 may determine beams (e.g., Tx/Rx beams) that will be used for communicating via the second radio frequency link. The respective devices may determine the beam(s) (e.g., narrow beams) that will be used for communicating via the second radio frequency link based on communicating the signaling at 435, performing the analysis at 440, performing the beam training procedure at 445, or any combination thereof.

For example, in cases where the wireless devices do not perform a beam training procedure for the second radio frequency link (e.g., Step 440=NO), the wireless devices may determine the Tx/Rx beams for the second radio frequency link based on previous beams used for the second radio frequency link, based on beam information associated with the first radio frequency link (as determined at 420), and the like. In this regard, in cases where the wireless devices do not perform a beam training procedure for the non-sub-7 link, the beams for the second radio frequency link may be determined by leveraging information and operations performed via the sub-7 link.

Comparatively, in cases where the wireless devices do perform a beam training procedure for the second radio frequency link (e.g., Step 440=YES), the wireless devices may determine the Tx/Rx beams for the second radio frequency link based on the beam training procedure performed at 445.

At 455, the non-AP MLD 405 and the AP MLD 410 may communicate one or more messages with one another via the second radio frequency link using the beam(s) determined at 450. In this regard, the wireless devices may communicate with one another at 455 based on communicating the signaling at 435, performing the analysis at 440, performing the beam training procedure at 445, determining the beams for the second radio frequency link at 450, or any combination thereof.

Techniques described herein may facilitate more efficient beam training procedures on non-sub-7 links. For example, techniques described herein may enable wireless devices to completely refrain from performing beam training procedures on non-sub-7 links. Moreover, in cases where beam training is still expected to be performed on a non-sub-7 link, techniques described herein may enable the wireless devices to determine what level of precision/accuracy of beam training procedure should be performed. As such, techniques described herein may reduce a frequency with which beam training procedures are performed on non-sub-7 links. Further, when beam training procedures are expected to be performed, techniques described herein may enable wireless devices to perform less intensive beam training procedures in some instances, which may reduce the time and power consumption used to perform such beam training procedures. By reducing time and power consumption associated with beam training procedures performed on non-sub-7 links, techniques described herein may improve battery life at wireless devices (e.g., non-AP MLDs), expedite communications over non-sub-7 bands, and improve overall user experience.

Figure 5:
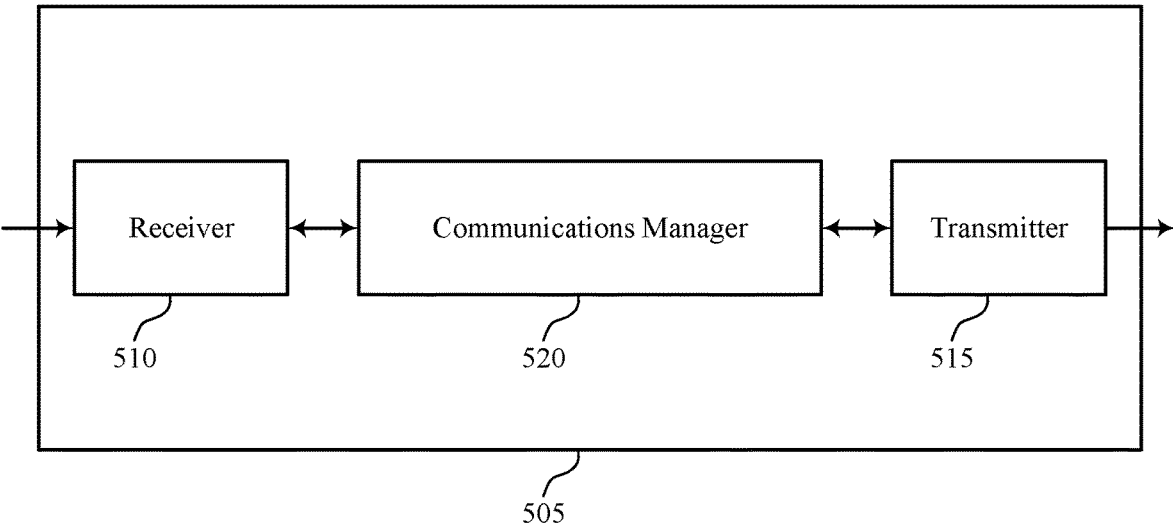
FIGS. 5 and 6 show block diagrams of devices that support beamforming techniques in Wi-Fi frequency bands in accordance with one or more aspects of the present disclosure.

FIG. 5 shows a block diagram 500 of a device 505 that supports beamforming techniques in Wi-Fi frequency bands in accordance with one or more aspects of the present disclosure. The device 505 may be an example of aspects of an AP as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beamforming techniques in Wi-Fi frequency bands). Information may be passed on to other components of the device 505. The receiver 510 may utilize a single antenna or a set of multiple antennas.

The transmitter 515 may provide a means for transmitting signals generated by other components of the device 505. The transmitter 515 may utilize a single antenna or a set of multiple antennas.

The communications manager 520, the receiver 510, the transmitter 515, or various combinations thereof or various components thereof may be examples of means for performing various aspects of beamforming techniques in Wi-Fi frequency bands as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first wireless device in accordance with examples as disclosed herein. For example, the communications manager 520 may be configured as or otherwise support a means for communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The communications manager 520 may be configured as or otherwise support a means for communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that facilitate more efficient beam training procedures on non-sub-7 links. For example, techniques described herein may enable wireless devices to completely refrain from performing beam training procedures on non-sub-7 links. Moreover, in cases where beam training is still expected to be performed on a non-sub-7 link, techniques described herein may enable the wireless devices to determine what level of precision/accuracy of beam training procedure should be performed. As such, techniques described herein may reduce a frequency with which beam training procedures are performed on non-sub-7 links. Further, when beam training procedures are expected to be performed, techniques described herein may enable wireless devices to perform less intensive beam training procedures in some instances, which may reduce the time and power consumption used to perform such beam training procedures. By reducing time and power consumption associated with beam training procedures performed on non-sub-7 links, techniques described herein may improve battery life at wireless devices (e.g., non-AP MLDs), expedite communications over non-sub-7 bands, and improve overall user experience.

Figure 6:
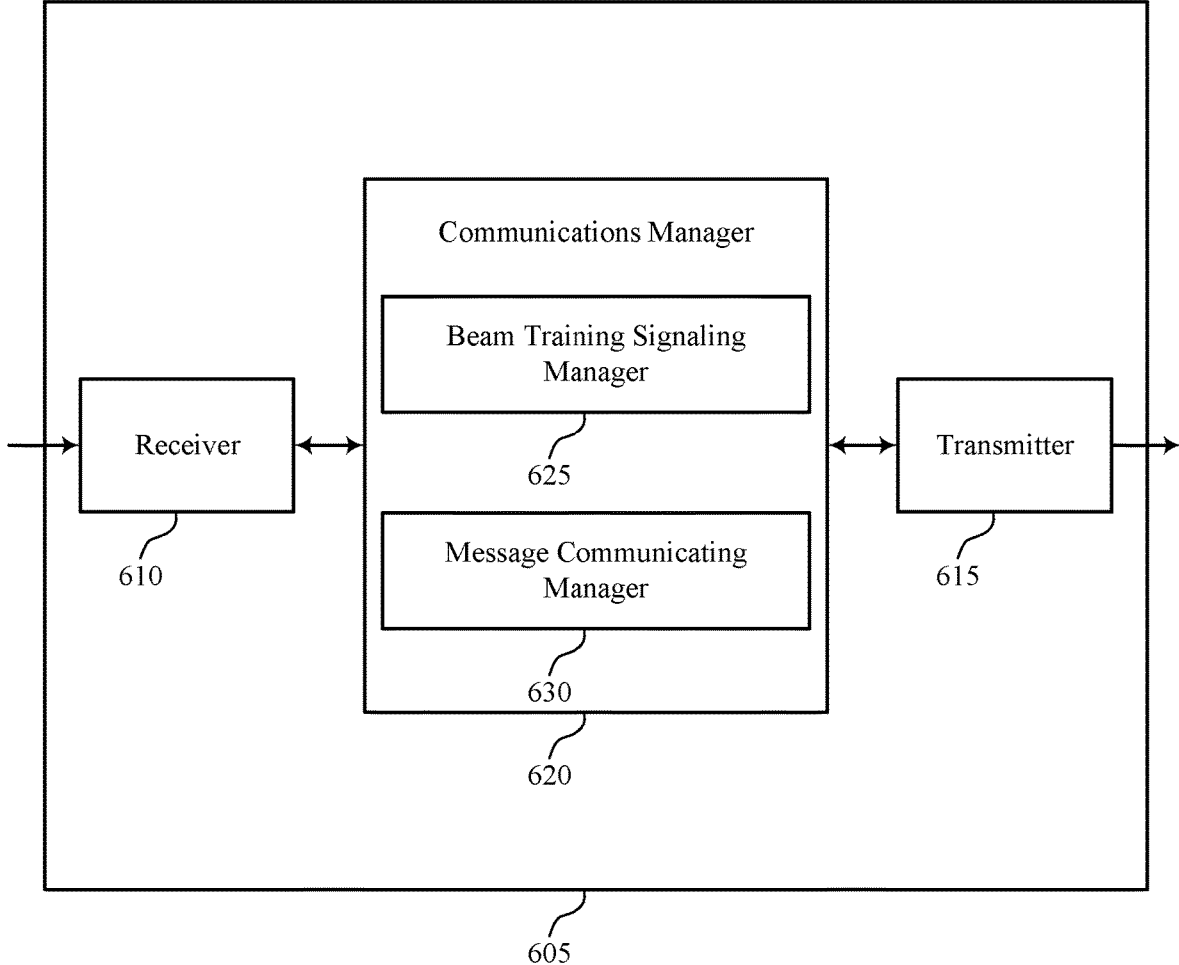

FIG. 6 shows a block diagram 600 of a device 605 that supports beamforming techniques in Wi-Fi frequency bands in accordance with one or more aspects of the present disclosure. The device 605 may be an example of aspects of a device 505 or an AP as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beamforming techniques in Wi-Fi frequency bands). Information may be passed on to other components of the device 605. The receiver 610 may utilize a single antenna or a set of multiple antennas.

The transmitter 615 may provide a means for transmitting signals generated by other components of the device 605. The transmitter 615 may utilize a single antenna or a set of multiple antennas.

The device 605, or various components thereof, may be an example of means for performing various aspects of beamforming techniques in Wi-Fi frequency bands as described herein. For example, the communications manager 620 may include a beam training signaling manager 625 a message communicating manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first wireless device in accordance with examples as disclosed herein. The beam training signaling manager 625 may be configured as or otherwise support a means for communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The message communicating manager 630 may be configured as or otherwise support a means for communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

Figure 7:
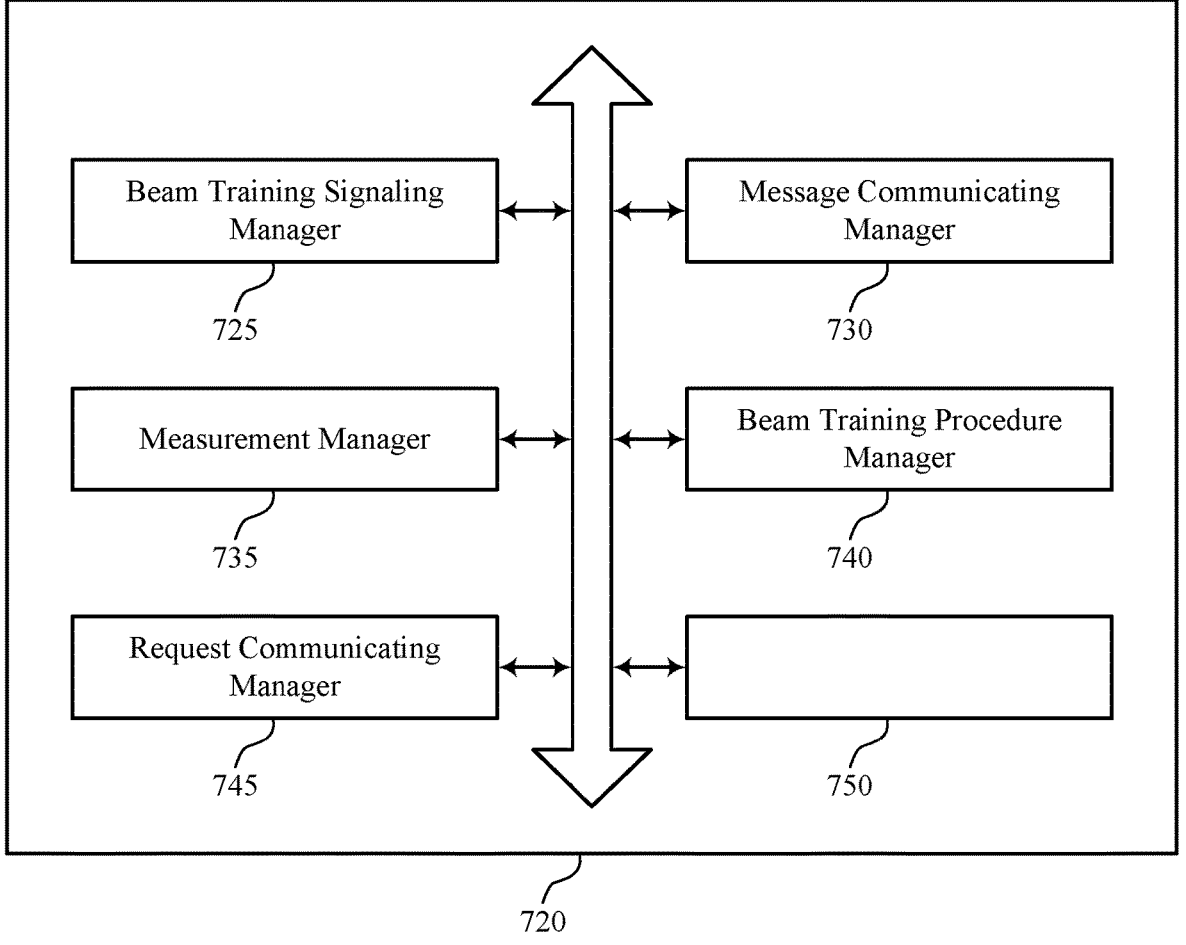
FIG. 7 shows a block diagram of a communications manager that supports beamforming techniques in Wi-Fi frequency bands in accordance with one or more aspects of the present disclosure.

FIG. 7 shows a block diagram 700 of a communications manager 720 that supports beamforming techniques in Wi-Fi frequency bands in accordance with one or more aspects of the present disclosure. The communications manager 720 may be an example of aspects of a communications manager 520, a communications manager 620, or both, as described herein. The communications manager 720, or various components thereof, may be an example of means for performing various aspects of beamforming techniques in Wi-Fi frequency bands as described herein. For example, the communications manager 720 may include a beam training signaling manager 725, a message communicating manager 730, a measurement manager 735, a beam training procedure manager 740, a request communicating manager 745, or any combination thereof. Each of these components may communicate, directly or indirectly, with one another (e.g., via one or more buses).

The communications manager 720 may support wireless communications at a first wireless device in accordance with examples as disclosed herein. The beam training signaling manager 725 may be configured as or otherwise support a means for communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The message communicating manager 730 may be configured as or otherwise support a means for communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

In some examples, the measurement manager 735 may be configured as or otherwise support a means for performing one or more measurements on signals received from the second wireless device via the radio frequency link, where the signaling indicates the selection between the first beam training procedure and the second beam training procedure based on the one or more measurements failing to satisfy one or more thresholds.

In some examples, the measurement manager 735 may be configured as or otherwise support a means for performing one or more measurements on signals received from the second wireless device via the radio frequency link, where the signaling indicates the first wireless device and the second wireless device are to skip performance of the beam training procedure based on the one or more measurements satisfying one or more thresholds.

In some examples, the radio frequency link is associated with a first frequency band, and the message communicating manager 730 may be configured as or otherwise support a means for communicating with the second wireless device via a second radio frequency link associated with a second frequency band different from the first frequency band, where communicating the signaling is based on position information, beam information, or both, where the position information, the beam information, or both, is based on communicating via the second radio frequency link.

In some examples, the first frequency band is associated with a frequency above 7 GHz. In some examples, the second frequency band is associated with a frequency below 7 GHz.

In some examples, the beam training signaling manager 725 may be configured as or otherwise support a means for communicating the signaling indicating the selection between the first beam training procedure and the second beam training procedure based on the first wireless device, the second wireless device, or both, previously operating in accordance with an idle state for at least a time duration.

In some examples, the first beam training procedure includes a beam refinement procedure, and the beam training procedure manager 740 may be configured as or otherwise support a means for performing one of the first beam training procedure or the second beam training procedure in accordance with the signaling indicating the selection between the first beam training procedure and the second beam training procedure, where the beam used for communicating the one or more messages via the radio frequency link is selected based on performing the first beam training procedure or the second beam training procedure.

In some examples, to support performing the second beam training procedure, the beam training procedure manager 740 may be configured as or otherwise support a means for receiving, from the second wireless device during one or more beacon transmit intervals associated with the sector-level training procedure, a first set of multiple signals using a set of multiple wide beams that are spatially separated within a set of multiple sectors to identify a first sector of the set of multiple sectors. In some examples, to support performing the second beam training procedure, the beam training procedure manager 740 may be configured as or otherwise support a means for receiving, from the second wireless device during one or more service periods associated with the beam refinement procedure, a second set of multiple signals using a set of multiple narrow beams that are spatially separated within the first sector, where the beam is selected from the set of multiple narrow beams.

In some examples, to support performing the second beam training procedure, the beam training procedure manager 740 may be configured as or otherwise support a means for transmitting, to the second wireless device during one or more service periods associated with the sector-level training procedure, a first set of multiple signals using a set of multiple wide beams that are spatially separated within a sector of a set of multiple sectors to identify a first sector of the set of multiple sectors. In some examples, to support performing the second beam training procedure, the beam training procedure manager 740 may be configured as or otherwise support a means for transmitting, to the second wireless device during one or more additional service periods associated with the beam refinement procedure, a second set of multiple signals using a set of multiple narrow beams that are spatially separated within the first sector, where the beam is selected from the set of multiple narrow beams.

In some examples, to support performing the first beam training procedure, the beam training procedure manager 740 may be configured as or otherwise support a means for transmitting, to the second wireless device as part of the beam refinement procedure, a set of multiple signals using a subset of narrow beams of the set of multiple narrow beams that are spatially separated across a sector of the set of multiple sectors, where the beam is selected from the subset of narrow beams.

In some examples, to support performing the second beam training procedure, the beam training procedure manager 740 may be configured as or otherwise support a means for receiving, from the second wireless device as part of the sector-level training procedure, a first set of multiple signals using a set of multiple wide beams that are spatially separated across a set of multiple sectors to identify a first sector of the set of multiple sectors. In some examples, to support performing the second beam training procedure, the beam training procedure manager 740 may be configured as or otherwise support a means for receiving, from the second wireless device as part of the beam refinement procedure, a second set of multiple signals using a set of multiple narrow beams that are spatially separated across the first sector, where the beam is selected from the set of multiple narrow beams.

In some examples, the 750 may be configured as or otherwise support a means for communicating, with the second wireless device, a message indicating the first sector of the set of multiple sectors based on transmitting the first set of multiple signals as part of the sector-level training procedure, where transmitting the second set of multiple signals as part of the beam refinement procedure is based on the message indicating the first sector.

In some examples, the request communicating manager 745 may be configured as or otherwise support a means for communicating, with the second wireless device, a request for one of the first beam training procedure or the second beam training procedure, where the signaling indicates the selection between the first beam training procedure and the second beam training procedure based on the request.

In some examples, the beam training signaling manager 725 may be configured as or otherwise support a means for communicating the signaling based on a mobility state associated with the first wireless device, the second wireless device, or both.

In some examples, the first wireless device includes an AP, a first MLD, or both. In some examples, the second wireless device includes an STA, a second MLD, or both. In some examples, the first wireless device includes the STA, the first MLD, or both. In some examples, the second wireless device includes the AP, the second MLD, or both.

Figure 8:
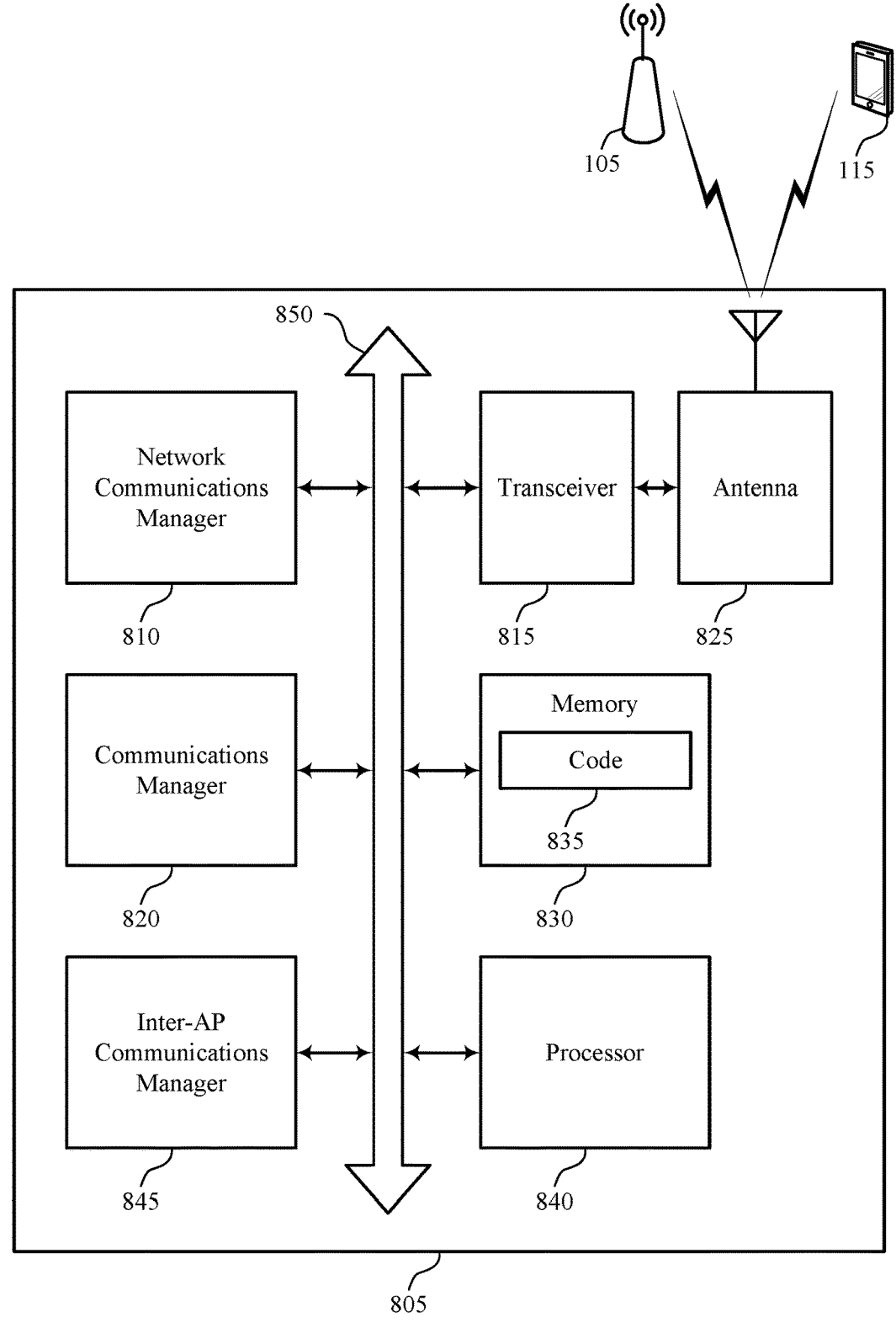
FIG. 8 shows a diagram of a system including a device that supports beamforming techniques in Wi-Fi frequency bands in accordance with one or more aspects of the present disclosure.

FIG. 8 shows a diagram of a system 800 including a device 805 that supports beamforming techniques in Wi-Fi frequency bands in accordance with one or more aspects of the present disclosure. The device 805 may be an example of or include the components of a device 505, a device 605, or an AP as described herein. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-AP communications manager 845. These components may be in electronic communication or otherwise coupled (e.g., operatively, communicatively, functionally, electronically, electrically) via one or more buses (e.g., a bus 850).

The network communications manager 810 may manage communications with a core network (e.g., via one or more wired backhaul links). For example, the network communications manager 810 may manage the transfer of data communications for client devices, such as one or more STAs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets and provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting beamforming techniques in Wi-Fi frequency bands). For example, the device 805 or a component of the device 805 may include a processor 840 and memory 830 coupled with or to the processor 840, the processor 840 and memory 830 configured to perform various functions described herein.

The inter-station communications manager 845 may manage communications with other APs 105, and may include a controller or scheduler for controlling communications with STAs 115 in cooperation with other APs 105. For example, the inter-station communications manager 845 may coordinate scheduling for transmissions to APs 105 for various interference mitigation techniques such as beamforming or joint transmission. In some examples, the inter-station communications manager 845 may provide an X2 interface within an LTE/LTE-A wireless communication network technology to provide communication between APs 105.

The communications manager 820 may support wireless communications at a first wireless device in accordance with examples as disclosed herein. For example, the communications manager 820 may be configured as or otherwise support a means for communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The communications manager 820 may be configured as or otherwise support a means for communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure.

By including or configuring the communications manager 820 in accordance with examples as described herein, the device 805 may support techniques that facilitate more efficient beam training procedures on non-sub-7 links. For example, techniques described herein may enable wireless devices to completely refrain from performing beam training procedures on non-sub-7 links. Moreover, in cases where beam training is still expected to be performed on a non-sub-7 link, techniques described herein may enable the wireless devices to determine what level of precision/accuracy of beam training procedure should be performed. As such, techniques described herein may reduce a frequency with which beam training procedures are performed on non-sub-7 links. Further, when beam training procedures are expected to be performed, techniques described herein may enable wireless devices to perform less intensive beam training procedures in some instances, which may reduce the time and power consumption used to perform such beam training procedures. By reducing time and power consumption associated with beam training procedures performed on non-sub-7 links, techniques described herein may improve battery life at wireless devices (e.g., non-AP MLDs), expedite communications over non-sub-7 bands, and improve overall user experience.

FIG. 9 shows a flowchart illustrating a method 900 that supports beamforming techniques in Wi-Fi frequency bands in accordance with one or more aspects of the present disclosure. The operations of the method 900 may be implemented by an AP or its components as described herein. For example, the operations of the method 900 may be performed by an AP as described with reference to FIGs. FIG. 1 through 8. In some examples, an AP may execute a set of instructions to control the functional elements of the AP to perform the described functions. Additionally, or alternatively, the AP may perform aspects of the described functions using special-purpose hardware.

At 905, the method may include communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link. The operations of 905 may be performed in accordance with examples as disclosed herein. In some examples, aspects of the operations of 905 may be performed by a beam training signaling manager 725 as described with reference to FIG. 7.

At 910, the method may include communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure. The operations of 910 may be performed in accordance with examples as disclosed herein. In some examples, aspects of the operations of 910 may be performed by a message communicating manager 730 as described with reference to FIG. 7.

FIG. 10 shows a flowchart illustrating a method 1000 that supports beamforming techniques in Wi-Fi frequency bands in accordance with one or more aspects of the present disclosure. The operations of the method 1000 may be implemented by an AP or its components as described herein. For example, the operations of the method 1000 may be performed by an AP as described with reference to FIGs. FIG. 1 through 8. In some examples, an AP may execute a set of instructions to control the functional elements of the AP to perform the described functions. Additionally, or alternatively, the AP may perform aspects of the described functions using special-purpose hardware.

At 1005, the method may include performing one or more measurements on signals received from the second wireless device via the radio frequency link. The operations of 1005 may be performed in accordance with examples as disclosed herein. In some examples, aspects of the operations of 1005 may be performed by a measurement manager 735 as described with reference to FIG. 7.

At 1010, the method may include communicating signaling with a second wireless device based on establishing a radio frequency link, the signaling indicating a selection between a first beam training procedure associated with the radio frequency link and a second beam training procedure associated with the radio frequency link based on the one or more measurements failing to satisfy one or more thresholds. The operations of 1010 may be performed in accordance with examples as disclosed herein. In some examples, aspects of the operations of 1010 may be performed by a beam training signaling manager 725 as described with reference to FIG. 7.

At 1015, the method may include communicating one or more messages with the second wireless device via the radio frequency link using a beam, the beam being based on the signaling indicating the selection between the first beam training procedure and the second beam training procedure. The operations of 1015 may be performed in accordance with examples as disclosed herein. In some examples, aspects of the operations of 1015 may be performed by a message communicating manager 730 as described with reference to FIG. 7.

FIG. 11 shows a flowchart illustrating a method 1100 that supports beamforming techniques in Wi-Fi frequency bands in accordance with one or more aspects of the present disclosure. The operations of the method 1100 may be implemented by an AP or its components as described herein. For example, the operations of the method 1100 may be performed by an AP as described with reference to FIGs. FIG. 1 through 8. In some examples, an AP may execute a set of instructions to control the functional elements of the AP to perform the described functions. Additionally, or alternatively, the AP may perform aspects of the described functions using special-purpose hardware.

At 1105, the method may include performing one or more measurements on signals received from the second wireless device via the radio frequency link, where the signaling indicates the first wireless device and the second wireless device are to skip performance of the beam training procedure based on the one or more measurements satisfying one or more thresholds. The operations of 1105 may be performed in accordance with examples as disclosed herein. In some examples, aspects of the operations of 1105 may be performed by a measurement manager 735 as described with reference to FIG. 7.

At 1110, the method may include communicating signaling with a second wireless device based on establishing a radio frequency link, the signaling indicating the first wireless device and the second wireless device are to skip performance of a beam training procedure based at least in part on the one or more measurements satisfying one or more thresholds. The operations of 1110 may be performed in accordance with examples as disclosed herein. In some examples, aspects of the operations of 1110 may be performed by a beam training signaling manager 725 as described with reference to FIG. 7.

At 1115, the method may include communicating one or more messages with the second wireless device via the radio frequency link using a beam, the beam being based on the signaling indicating the first wireless device and the second wireless device are to skip performance of the beam training procedure. The operations of 1115 may be performed in accordance with examples as disclosed herein. In some examples, aspects of the operations of 1115 may be performed by a message communicating manager 730 as described with reference to FIG. 7.

FIG. 12 shows a flowchart illustrating a method 1200 that supports beamforming techniques in Wi-Fi frequency bands in accordance with one or more aspects of the present disclosure. The operations of the method 1200 may be implemented by an AP or its components as described herein. For example, the operations of the method 1200 may be performed by an AP as described with reference to FIGs. FIG. 1 through 8. In some examples, an AP may execute a set of instructions to control the functional elements of the AP to perform the described functions. Additionally, or alternatively, the AP may perform aspects of the described functions using special-purpose hardware.

At 1205, the method may include communicating with the second wireless device via a second radio frequency link associated with a second frequency band different from a first frequency band, where communicating the signaling is based on position information, beam information, or both, where the position information, the beam information, or both, is based on communicating via the second radio frequency link. The operations of 1205 may be performed in accordance with examples as disclosed herein. In some examples, aspects of the operations of 1205 may be performed by a message communicating manager 730 as described with reference to FIG. 7.

At 1210, the method may include determining position information, beam information, or both, based at least in part on communicating via the second radio frequency link. The operations of 1210 may be performed in accordance with examples as disclosed herein. In some examples, aspects of the operations of 1210 may be performed by a message communicating manager 730 as described with reference to FIG. 7.

At 1215, the method may include communicating signaling with a second wireless device based on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link, wherein communicating the signaling is based at least in part on position information, beam information, or both, wherein the position information, the beam information, or both, is based at least in part on communicating via the second radio frequency link. The operations of 1215 may be performed in accordance with examples as disclosed herein. In some examples, aspects of the operations of 1215 may be performed by a beam training signaling manager 725 as described with reference to FIG. 7.

At 1220, the method may include communicating one or more messages with the second wireless device via the radio frequency link using a beam, the beam being based on whether the signaling indicates the first wireless device and the second wireless device are to skip performance of the beam training procedure, or indicates the selection between the first beam training procedure and the second beam training procedure. The operations of 1220 may be performed in accordance with examples as disclosed herein. In some examples, aspects of the operations of 1220 may be performed by a message communicating manager 730 as described with reference to FIG. 7.

The following provides an overview of aspects of the present disclosure:

Aspect 1: A method for wireless communications at a first wireless device, comprising: communicating signaling with a second wireless device based at least in part on establishing a radio frequency link, the signaling indicating the first wireless device and the second wireless device are to skip performance of a beam training procedure, or indicating a selection between a first beam training procedure associated with the radio frequency link and a second beam training procedure associated with the radio frequency link; and communicating one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure.

Aspect 2: The method of aspect 1, further comprising: performing one or more measurements on signals received from the second wireless device via the radio frequency link, wherein the signaling indicates the selection between the first beam training procedure and the second beam training procedure based at least in part on the one or more measurements failing to satisfy one or more thresholds.

Aspect 3: The method of any of aspects 1 through 2, further comprising: performing one or more measurements on signals received from the second wireless device via the radio frequency link, wherein the signaling indicates the first wireless device and the second wireless device are to skip performance of the beam training procedure based at least in part on the one or more measurements satisfying one or more thresholds.

Aspect 4: The method of any of aspects 1 through 3, wherein the radio frequency link is associated with a first frequency band, the method further comprising: communicating with the second wireless device via a second radio frequency link associated with a second frequency band different from the first frequency band, wherein communicating the signaling is based at least in part on position information, beam information, or both, wherein the position information, the beam information, or both, is based at least in part on communicating via the second radio frequency link.

Aspect 5: The method of aspect 4, wherein the first frequency band is associated with a frequency above 7 GHz, and the second frequency band is associated with a frequency below 7 GHz.

Aspect 6: The method of any of aspects 1 through 5, further comprising: communicating the signaling indicating the selection between the first beam training procedure and the second beam training procedure based at least in part on the first wireless device, the second wireless device, or both, previously operating in accordance with an idle state for at least a time duration.

Aspect 7: The method of any of aspects 1 through 6, wherein the first beam training procedure comprises a beam refinement procedure, and wherein the second beam training procedure comprises a sector-level training procedure and the beam refinement procedure, the method further comprising: performing one of the first beam training procedure or the second beam training procedure in accordance with the signaling indicating the selection between the first beam training procedure and the second beam training procedure, wherein the beam used for communicating the one or more messages via the radio frequency link is selected based at least in part on performing the first beam training procedure or the second beam training procedure.

Aspect 8: The method of aspect 7, wherein performing the second beam training procedure comprises: receiving, from the second wireless device during one or more beacon transmit intervals associated with the sector-level training procedure, a first plurality of signals using a plurality of wide beams that are spatially separated within a plurality of sectors to identify a first sector of the plurality of sectors; and receiving, from the second wireless device during one or more service periods associated with the beam refinement procedure, a second plurality of signals using a plurality of narrow beams that are spatially separated within the first sector, wherein the beam is selected from the plurality of narrow beams.

Aspect 9: The method of any of aspects 7 through 8, wherein performing the second beam training procedure comprises: transmitting, to the second wireless device during one or more service periods associated with the sector-level training procedure, a first plurality of signals using a plurality of wide beams that are spatially separated within a sector of a plurality of sectors to identify a first sector of the plurality of sectors; and transmitting, to the second wireless device during one or more additional service periods associated with the beam refinement procedure, a second plurality of signals using a plurality of narrow beams that are spatially separated within the first sector, wherein the beam is selected from the plurality of narrow beams.

Aspect 10: The method of any of aspects 7 through 9, wherein the first wireless device is associated with a plurality of narrow beams that are spatially separated across a plurality of sectors, and wherein performing the first beam training procedure comprises: transmitting, to the second wireless device as part of the beam refinement procedure, a plurality of signals using a subset of narrow beams of the plurality of narrow beams that are spatially separated across a sector of the plurality of sectors, wherein the beam is selected from the subset of narrow beams.

Aspect 11: The method of any of aspects 7 through 10, and wherein performing the second beam training procedure comprises: receiving, from the second wireless device as part of the sector-level training procedure, a first plurality of signals using a plurality of wide beams that are spatially separated across a plurality of sectors to identify a first sector of the plurality of sectors; and receiving, from the second wireless device as part of the beam refinement procedure, a second plurality of signals using a plurality of narrow beams that are spatially separated across the first sector, wherein the beam is selected from the plurality of narrow beams.

Aspect 12: The method of aspect 11, further comprising: communicating, with the second wireless device, a message indicating the first sector of the plurality of sectors based at least in part on transmitting the first plurality of signals as part of the sector-level training procedure, wherein transmitting the second plurality of signals as part of the beam refinement procedure is based at least in part on the message indicating the first sector.

Aspect 13: The method of any of aspects 1 through 12, further comprising: communicating, with the second wireless device, a request for one of the first beam training procedure or the second beam training procedure, wherein the signaling indicates the selection between the first beam training procedure and the second beam training procedure based at least in part on the request.

Aspect 14: The method of any of aspects 1 through 13, further comprising: communicating the signaling based at least in part on a mobility state associated with the first wireless device, the second wireless device, or both.

Aspect 15: The method of any of aspects 1 through 14, wherein the first wireless device comprises an AP, a first multi-link device, or both, and the second wireless device comprises an STA, a second multi-link device, or both, or the first wireless device comprises the STA, the first multi-link device, or both, and the second wireless device comprises the AP, the second multi-link device, or both.

Aspect 16: An apparatus for wireless communications at a first wireless device, comprising a processor; memory coupled with the processor; and instructions stored in the memory and executable by the processor to cause the apparatus to perform a method of any of aspects 1 through 15.

Aspect 17: An apparatus for wireless communications at a first wireless device, comprising at least one means for performing a method of any of aspects 1 through 15.

Aspect 18: A non-transitory computer-readable medium storing code for wireless communications at a first wireless device, the code comprising instructions executable by a processor to perform a method of any of aspects 1 through 15.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
one or more processors;
one or more memories coupled with the one or more processors; and
instructions stored in the one or more memories and executable by the one or more processors to cause the apparatus to:
perform one or more measurements on signals received from a second wireless device via a radio frequency link;
communicate signaling with the second wireless device via the radio frequency link, the signaling indicating the first wireless device and the second wireless device are to skip performance of a beam training procedure based at least in part on the one or more measurements satisfying one or more thresholds, or indicating a selection between a first beam training procedure associated with the radio frequency link and a second beam training procedure associated with the radio frequency link, wherein the selection between the first beam training procedure and the second beam training procedure is based at least in part on the one or more measurements failing to satisfy the one or more thresholds; and
communicate one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure.

2. The apparatus of claim 1, wherein the radio frequency link is associated with a first frequency band, and the instructions are further executable by the one or more processors to cause the apparatus to:
communicate with the second wireless device via a second radio frequency link associated with a second frequency band different from the first frequency band, wherein communicating the signaling is based at least in part on position information, beam information, or both, wherein the position information, the beam information, or both, is based at least in part on communicating via the second radio frequency link.

3. The apparatus of claim 2, wherein the first frequency band is associated with a frequency above 7 GHZ, and wherein the second frequency band is associated with a frequency below 7 GHz.

4. The apparatus of claim 1, wherein the instructions are further executable by the one or more processors to cause the apparatus to:
communicate the signaling indicating the selection between the first beam training procedure and the second beam training procedure based at least in part on the first wireless device, the second wireless device, or both, previously operating in accordance with an idle state for at least a time duration.

5. The apparatus of claim 1, wherein the first beam training procedure comprises a beam refinement procedure without a sector-level training procedure, and wherein the second beam training procedure comprises the sector-level training procedure and the beam refinement procedure, and the instructions are further executable by the one or more processors to cause the apparatus to:
perform one of the first beam training procedure or the second beam training procedure in accordance with the signaling indicating the selection between the first beam training procedure and the second beam training procedure, wherein the beam used for communicating the one or more messages via the radio frequency link is selected based at least in part on performing the first beam training procedure or the second beam training procedure.

6. The apparatus of claim 5, wherein the instructions to perform the second beam training procedure are executable by the one or more processors to cause the apparatus to:
receive, from the second wireless device during one or more beacon transmit intervals associated with the sector-level training procedure, a first plurality of signals using a plurality of wide beams that are spatially separated within a plurality of sectors to identify a first sector of the plurality of sectors; and receive, from the second wireless device during one or more service periods associated with the beam refinement procedure, a second plurality of signals using a plurality of narrow beams that are spatially separated within the first sector, wherein the beam is selected from the plurality of narrow beams.

7. The apparatus of claim 5, wherein the instructions to perform the second beam training procedure are executable by the one or more processors to cause the apparatus to:
transmit, to the second wireless device during one or more service periods associated with the sector-level training procedure, a first plurality of signals using a plurality of wide beams that are spatially separated within a sector of a plurality of sectors to identify a first sector of the plurality of sectors; and
transmit, to the second wireless device during one or more additional service periods associated with the beam refinement procedure, a second plurality of signals using a plurality of narrow beams that are spatially separated within the first sector, wherein the beam is selected from the plurality of narrow beams.

8. The apparatus of claim 5, wherein the first wireless device is associated with a plurality of narrow beams that are spatially separated across a plurality of sectors, and wherein the instructions to perform the first beam training procedure are executable by the one or more processors to cause the apparatus to:
transmit, to the second wireless device as part of the beam refinement procedure, a plurality of signals using a subset of narrow beams of the plurality of narrow beams that are spatially separated across a sector of the plurality of sectors, wherein the beam is selected from the subset of narrow beams.

9. The apparatus of claim 5, wherein the instructions to perform the second beam training procedure are executable by the one or more processors to cause the apparatus to:
receive, from the second wireless device as part of the sector-level training procedure, a first plurality of signals using a plurality of wide beams that are spatially separated across a plurality of sectors to identify a first sector of the plurality of sectors; and
receive, from the second wireless device as part of the beam refinement procedure, a second plurality of signals using a plurality of narrow beams that are spatially separated across the first sector, wherein the beam is selected from the plurality of narrow beams.

10. The apparatus of claim 9, wherein the instructions are further executable by the one or more processors to cause the apparatus to:
communicate, with the second wireless device, a message indicating the first sector of the plurality of sectors based at least in part on transmitting the first plurality of signals as part of the sector-level training procedure, wherein transmitting the second plurality of signals as part of the beam refinement procedure is based at least in part on the message indicating the first sector.

11. The apparatus of claim 1, wherein the instructions are further executable by the one or more processors to cause the apparatus to:
communicate, with the second wireless device, a request for one of the first beam training procedure or the second beam training procedure, wherein the signaling indicates the selection between the first beam training procedure and the second beam training procedure based at least in part on the request.

12. The apparatus of claim 1, wherein the instructions are further executable by the one or more processors to cause the apparatus to:
communicate the signaling based at least in part on a mobility state associated with the first wireless device, the second wireless device, or both.

13. The apparatus of claim 1,
wherein the first wireless device comprises an access point (AP), a first multi-link device, or both, and wherein the second wireless device comprises a station (STA), a second multi-link device, or both, or
wherein the first wireless device comprises the STA, the first multi-link device, or both, and wherein the second wireless device comprises the AP, the second multi-link device, or both.

14. A method for wireless communications at a first wireless device, comprising:
performing one or more measurements on signals received from a second wireless device via a radio frequency link;
communicating signaling with the second wireless device via the radio frequency link, the signaling indicating the first wireless device and the second wireless device are to skip performance of a beam training procedure based at least in part on the one or more measurements satisfying one or more thresholds, or indicating a selection between a first beam training procedure associated with the radio frequency link and a second beam training procedure associated with the radio frequency link, wherein the selection between the first beam training procedure and the second beam training procedure is based at least in part on the one or more measurements failing to satisfy the one or more thresholds; and
communicating one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure.

15. The method of claim 14, wherein the radio frequency link is associated with a first frequency band, the method further comprising:
communicating with the second wireless device via a second radio frequency link associated with a second frequency band different from the first frequency band, wherein communicating the signaling is based at least in part on position information, beam information, or both, wherein the position information, the beam information, or both, is based at least in part on communicating via the second radio frequency link.

16. The method of claim 15, wherein the first frequency band is associated with a frequency above 7 GHZ, and wherein the second frequency band is associated with a frequency below 7 GHz.

17. The method of claim 14, further comprising:
communicating the signaling indicating the selection between the first beam training procedure and the second beam training procedure based at least in part on the first wireless device, the second wireless device, or both, previously operating in accordance with an idle state for at least a time duration.

18. The method of claim 14, wherein the first beam training procedure comprises a beam refinement procedure without a sector-level training procedure, and wherein the second beam training procedure comprises the sector-level training procedure and the beam refinement procedure, the method further comprising:

performing one of the first beam training procedure or the second beam training procedure in accordance with the signaling indicating the selection between the first beam training procedure and the second beam training procedure, wherein the beam used for communicating the one or more messages via the radio frequency link is selected based at least in part on performing the first beam training procedure or the second beam training procedure.

19. The method of claim 18, wherein performing the second beam training procedure comprises:

receiving, from the second wireless device during one or more beacon transmit intervals associated with the sector-level training procedure, a first plurality of signals using a plurality of wide beams that are spatially separated within a plurality of sectors to identify a first sector of the plurality of sectors; and receiving, from the second wireless device during one or more service periods associated with the beam refinement procedure, a second plurality of signals using a plurality of narrow beams that are spatially separated within the first sector, wherein the beam is selected from the plurality of narrow beams.

20. The method of claim 18, wherein performing the second beam training procedure comprises:

transmitting, to the second wireless device during one or more service periods associated with the sector-level training procedure, a first plurality of signals using a plurality of wide beams that are spatially separated within a sector of a plurality of sectors to identify a first sector of the plurality of sectors; and transmitting, to the second wireless device during one or more additional service periods associated with the beam refinement procedure, a second plurality of signals using a plurality of narrow beams that are spatially separated within the first sector, wherein the beam is selected from the plurality of narrow beams.

21. The method of claim 18, wherein the first wireless device is associated with a plurality of narrow beams that are spatially separated across a plurality of sectors, and wherein performing the first beam training procedure comprises:

transmitting, to the second wireless device as part of the beam refinement procedure, a plurality of signals using a subset of narrow beams of the plurality of narrow beams that are spatially separated across a sector of the plurality of sectors, wherein the beam is selected from the subset of narrow beams.

22. The method of claim 18, and wherein performing the second beam training procedure comprises:

receiving, from the second wireless device as part of the sector-level training procedure, a first plurality of signals using a plurality of wide beams that are spatially separated across a plurality of sectors to identify a first sector of the plurality of sectors; and receiving, from the second wireless device as part of the beam refinement procedure, a second plurality of signals using a plurality of narrow beams that are spatially separated across the first sector, wherein the beam is selected from the plurality of narrow beams.

23. The method of claim 22, further comprising:

communicating, with the second wireless device, a message indicating the first sector of the plurality of sectors based at least in part on transmitting the first plurality of signals as part of the sector-level training procedure, wherein transmitting the second plurality of signals as part of the beam refinement procedure is based at least in part on the message indicating the first sector.

24. The method of claim 14, further comprising:

communicating, with the second wireless device, a request for one of the first beam training procedure or the second beam training procedure, wherein the signaling indicates the selection between the first beam training procedure and the second beam training procedure based at least in part on the request.

25. The method of claim 14, further comprising:

communicating the signaling based at least in part on a mobility state associated with the first wireless device, the second wireless device, or both.

26. The method of claim 14, wherein the first wireless device comprises an access point (AP), a first multi-link device, or both, and wherein the second wireless device comprises a station (STA), a second multi-link device, or both, or wherein the first wireless device comprises the STA, the first multi-link device, or both, and wherein the second wireless device comprises the AP, the second multi-link device, or both.

27. An apparatus for wireless communications at a first wireless device, comprising:

means for performing one or more measurements on signals received from a second wireless device via a radio frequency link;

means for communicating signaling with the second wireless device via the radio frequency link, the signaling indicating the first wireless device and the second wireless device are to skip performance of a beam training procedure based at least in part on the one or more measurements satisfying one or more thresholds, or indicating a selection between a first beam training procedure associated with the radio frequency link and a second beam training procedure associated with the radio frequency link, wherein the selection between the first beam training procedure and the second beam training procedure is based at least in part on the one or more measurements failing to satisfy the one or more thresholds; and means for communicating one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure.

28. A non-transitory computer-readable medium storing code for wireless communications at a first wireless device, the code comprising instructions executable by a processor to:

perform one or more measurements on signals received from a second wireless device via a radio frequency link;

communicate signaling with the second wireless device via the radio frequency link, the signaling indicating the first wireless device and the second wireless device are to skip performance of a beam training procedure based at least in part on the one or more measurements satisfying one or more thresholds, or indicating a selection between a first beam training procedure associated with the radio frequency link and a second beam training procedure associated with the radio frequency link, wherein the selection between the first beam training procedure and the second beam training procedure is based at least in part on the one or more measurements failing to satisfy the one or more thresholds; and communicate one or more messages with the second wireless device via the radio frequency link using a beam, the beam being based at least in part on whether the signaling indicates the first wireless device and the second wireless device are to skip performance of the beam training procedure, or indicates the selection between the first beam training procedure and the second beam training procedure.

\* \* \* \* \*